(12) United States Patent
Ramaiah et al.

(10) Patent No.: US 7,567,187 B2
(45) Date of Patent: Jul. 28, 2009

(54) TAXIWAY AWARENESS AND ADVISORY SYSTEM

(75) Inventors: Vinoda Ramaiah, Bangalore (IN);
David B. Dwyer, Scottsdale, AZ (US);
Arindam Chakrabarti, Bangalore (IN);
Amit Rajwade, Bangalore (IN); Sudin Natarajan, Bangalore (IN);
Saravanakumar Gurusamy, Bangalore (IN)

(73) Assignee: Honeywell International Inc., Morristown, NJ (US)

( * ) Notice: Subject to any disclaimer, the term of this patent is extended or adjusted under 35 U.S.C. 154(b) by 333 days.

(21) Appl. No.: 11/502,654

(22) Filed: Aug. 11, 2006

(65) Prior Publication Data

US 2008/0042880 A1 Feb. 21, 2008

(51) Int. Cl.
*G08B 21/00* (2006.01)

(52) U.S. Cl. .................... 340/945; 340/971; 701/3; 701/15; 701/16

(58) Field of Classification Search ............. 340/945, 340/958, 980, 961, 971, 972, 957; 701/3, 701/15, 16
See application file for complete search history.

(56) References Cited

U.S. PATENT DOCUMENTS

| 5,530,440 | A  | * | 6/1996  | Danzer et al. ............... 340/933 |
|-----------|----|---|---------|---------------------------------------|
| 6,112,141 | A  |   | 8/2000  | Briffe et al.                         |
| 6,565,610 | B1 |   | 5/2003  | Wang et al.                           |
| 6,694,249 | B1 | * | 2/2004  | Anderson et al. ........... 701/120   |
| 7,308,343 | B1 | * | 12/2007 | Horvath et al. ................. 701/3 |
| 7,382,288 | B1 | * | 6/2008  | Wilson et al. ............... 340/972 |
| 2003/0045994 | A1 |   | 3/2003  | Stratton et al.                   |
| 2004/0006412 | A1 | * | 1/2004 | Doose et al. ................. 701/10 |
| 2005/0137758 | A1 |   | 6/2005  | He et al.                         |
| 2005/0190079 | A1 | * | 9/2005 | He ............................ 340/945 |
| 2005/0283305 | A1 | * | 12/2005 | Clark et al. ................. 701/120 |

FOREIGN PATENT DOCUMENTS

| EP | 1643214  | 4/2006 |
|----|----------|--------|
| WO | 03048888 | 6/2003 |
| WO | 03071228 | 8/2003 |

OTHER PUBLICATIONS

Interchange Standards for Terrain, Obstacle, and Aerodrome Mapping Data, RTCA,Inc, Jul. 29, 2004, 3 pages, RTCA/DO-291, Washington DC, USA.

(Continued)

*Primary Examiner*—Davetta W Goins
*Assistant Examiner*—Edny Labbees
(74) *Attorney, Agent, or Firm*—Ingrassia Fisher & Lorenz, P.C.

(57) ABSTRACT

Methods and apparatus are provided for displaying appropriate identifiers on aircraft taxiways on an aircraft flight deck display. Data representative of taxiway segments, in which each taxiway segment at least partially defines the aircraft taxiway, are supplied. At least a portion of the taxiway segments that define the aircraft taxiway are rendered on the flight deck display. The rendered taxiway segments include identified segments and non-identified segments. The identified segments have the identifier associated with the aircraft taxiway rendered thereon. The non-identified segments do not have the identifier associated with the aircraft taxiway rendered thereon.

41 Claims, 24 Drawing Sheets

OTHER PUBLICATIONS

User Requirments for Aerodrome Mapping Information, RTCA, Inc, Aug. 3, 2005, 3 pages, RTCA Do-272A.

Norris, Guy, UPS to test 'SafeRoute' next year, Flight International, Aug. 15, 2005 p. 12.

Mc Kinney, Dick, Preventing Overruns on Landing, Business & Commercial Aviation, Dec. 2005, pp. 61-64.

Fiorino, Frances, Most Wanted, 2006, Aviation Week & Space Technology/Nov. 21, 2005. pp. 43-46.

Roefs, F.D., et al. "Integrating routing in surface guidance displays," Digital Avionics Systems Conference 2004 (DASC 04), Oct. 2004, pp. 24-28, vol. 1, The 23rd Salt Lake City, UT, USA.

European Search Report for Application No. 07114071, mailed on Feb. 19, 2009.

* cited by examiner

TAXIWAY AWARENESS AND ADVISORY SYSTEM

FIELD OF THE INVENTION

The present invention generally relates to an aircraft flight deck display system and method and, more particularly, to a system and method for displaying appropriate identifiers on aircraft pathways, such as runways, taxiways, and/or apron elements.

BACKGROUND OF THE INVENTION

Air traffic, both private and commercial, continues to increase. With this increase, there has been a concomitant increase in the likelihood of runway incursions. Efforts are thus being made to increase aircraft flight crew situational awareness during ground operations. As part of this effort, a format for airport surface map databases has been developed that can be used to render airport surface maps on one or more flight deck displays. Although quite useful in providing a standard database from which to render airport surface maps, the database does not provide any position and/or orientation information for the various taxiway identifiers.

Accordingly, it is desirable to provide a system and method that will display appropriate identifiers on aircraft pathways, such as runways, taxiways, and/or apron elements, and that will provide sufficient position and/or orientation information to the flight crew. The present invention addresses at least this need. Furthermore, other desirable features and characteristics of the present invention will become apparent from the subsequent detailed description and the appended claims, taken in conjunction with the accompanying drawings and this background.

BRIEF SUMMARY

A system and method for displaying appropriate identifiers on aircraft pathways, such as runways, taxiways, and/or apron elements are provided. In one embodiment, and by way of example only, a method of displaying an aircraft taxiway and its associated identifier on a flight deck display includes supplying data representative of taxiway segments, in which each taxiway segment at least partially defines the aircraft taxiway. The data are processed to classify at least a portion of the taxiway segments as identified segments and non-identified segments, and at least a portion of the taxiway segments that define the aircraft taxiway are rendered on the flight deck display. The rendered taxiway segments include identified segments and non-identified segments. The identified segments have the identifier associated with the aircraft taxiway rendered thereon, and the non-identified segments do not have the identifier associated with the aircraft taxiway rendered thereon.

In another exemplary embodiment, a flight deck display system for an aircraft includes a processor and a display device. The processor is adapted to receive data representative of one or more segments of an aircraft taxiway. The processor is configured to classify at least a portion of the taxiway segments as identified segments and non-identified segments and supply image rendering display commands. The display device is coupled to receive the image rendering display commands and is operable, in response thereto, to render one or more of the aircraft taxiway segments that define the aircraft taxiway as either identified segments or non-identified segments. The identified segments have the identifier associated with the aircraft taxiway rendered thereon, and the non-identified segments do not have the identifier associated with the aircraft taxiway rendered thereon.

BRIEF DESCRIPTION OF THE DRAWINGS

The present invention will hereinafter be described in conjunction with the following drawing figures, wherein like numerals denote like elements, and wherein.

DETAILED DESCRIPTION OF THE INVENTION

Figure 1:
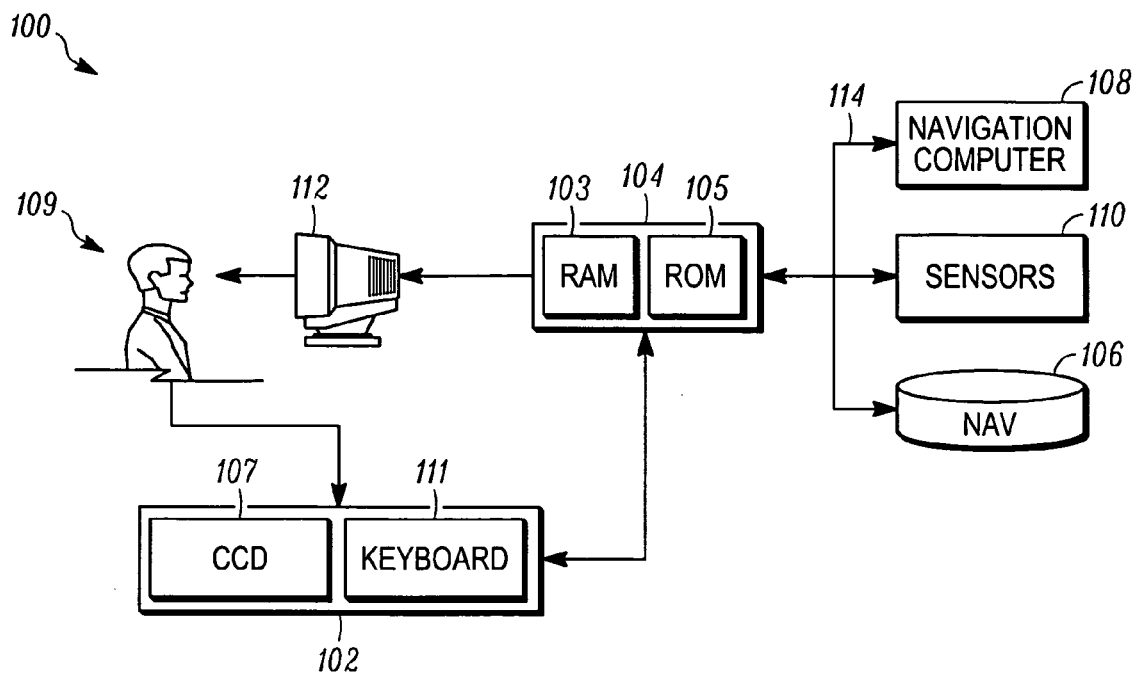
FIG. 1 is a functional block diagram of a flight deck display system according to one embodiment of the present invention.

The following detailed description is merely exemplary in nature and is not intended to limit the invention or the application and uses of the invention. Furthermore, there is no intention to be bound by any expressed or implied theory presented in the preceding technical field, background, brief summary or the following detailed description. In this regard, the present invention may be described in terms of functional block diagrams and various processing steps. It should be appreciated that such functional blocks may be realized in many different forms of hardware, firmware, and/or software components configured to perform the various functions. For example, the present invention may employ various integrated circuit components, e.g., memory elements, digital signal processing elements, look-up tables, and the like, which may carry out a variety of functions under the control of one or more microprocessors or other control devices. Such general techniques are known to those skilled in the art and are not described in detail herein. Moreover, it should be understood that the exemplary process illustrated may include additional or fewer steps or may be performed in the context of a larger processing scheme. Furthermore, the various methods presented in the drawing Figures or the specification are not to be construed as limiting the order in which the individual processing steps may be performed. It should be appreciated that the particular implementations shown and described herein are illustrative of the invention and its best mode and are not intended to otherwise limit the scope of the invention in any way.

Turning now to FIG. 1, an exemplary flight deck display system 100 is depicted and includes at least a user interface 102, a processor 104, one or more navigation databases 106, a navigation computer 108, various sensors 110, and one or more display device 112. The user interface 102 is in operable communication with the processor 104 and is configured to receive input from a user 109 (e.g., a pilot) and, in response to the user input, supply command signals to the processor 104. The user interface 102 may be any one, or combination, of various known user interface devices including, but not limited to, a cursor control device (CCD), such as a mouse, a trackball, or joystick, and/or a keyboard, one or more buttons, switches, or knobs. In the depicted embodiment, the user interface 102 includes a CCD 107 and a keyboard 111. The user 109 uses the CCD 107 to, among other things, move a cursor symbol on the display screen, and may use the keyboard 111 to, among other things, input various data.

The processor 104 is in operable communication with the navigation computer 108 and the display device 112 via, for example, a communication bus 114. The processor 104 is coupled to receive various types of data from the navigation computer 108 and may additionally receive navigation data from one or more of the navigation databases 106, and is further coupled to receive various types of inertial data from the various sensors 110, and is operable to supply appropriate display commands to the display device 112 that cause the display device 112 to render various images. As will be described in more detail further below, the various images include images of various aircraft pathways, such as taxiways, runways, and aprons, of various airports. Though not shown in FIG. 1, it will be appreciated that the processor 104 may additionally be coupled to receive various data from one or more other external systems. For example, the processor 104 may also be in operable communication with a source of weather data, a terrain avoidance and warning system (TAWS), a traffic and collision avoidance system (TCAS), an instrument landing system (ILS), and a runway awareness and advisory system (RAAS), just to name a few. If the processor 104 is in operable communication with one or more of these external systems, it will be appreciated that the processor 104 is additionally configured to supply appropriate display commands to the display device 112 so that the data supplied from these external systems may also be selectively displayed on the display device 112.

The processor 104 may include one or more microprocessors, each of which may be any one of numerous known general-purpose microprocessors or application specific processors that operate in response to program instructions. In the depicted embodiment, the processor 104 includes on-board RAM (random access memory) 103, and on-board ROM (read only memory) 105. The program instructions that control the processor 104 may be stored in either or both the RAM 103 and the ROM 105. For example, the operating system software may be stored in the ROM 105, whereas various operating mode software routines and various operational parameters may be stored in the RAM 103. It will be appreciated that this is merely exemplary of one scheme for storing operating system software and software routines, and that various other storage schemes may be implemented. It will also be appreciated that the processor 104 may be implemented using various other circuits, not just one or more programmable processors. For example, digital logic circuits and analog signal processing circuits could also be used.

The navigation databases 106 include various types of navigation-related data. These navigation-related data include various flight plan related data such as, for example, waypoints, distances between waypoints, headings between waypoints, navigational aids, obstructions, special use airspace, political boundaries, communication frequencies, aircraft approach information, protected airspace data, and data related to different airports including, for example, data representative of published aeronautical data, data representative of airport maps, including altitude data, data representative of fixed airport obstacles (towers, buildings, and hangars), various data representative of various aircraft pathways (e.g., taxiways, runways, apron elements, etc.), data representative of various airport identifiers, data representative of various aircraft pathway identifiers, data representative of various aircraft pathway width and length values, data representative of the position and altitude of various aircraft pathways, various aircraft pathway survey data, including runway and taxiway center point, runway and taxiway centerline, and runway and taxiway endpoints, just to name a few. It will be appreciated that, although the navigation databases 106 are, for clarity and convenience, shown as being stored separate from the processor 104, all or portions of these databases 106 could be loaded into the on-board RAM 103, or integrally formed as part of the processor 104, and/or RAM 103, and/or ROM 105. The navigation databases 106, or data forming portions thereof, could also be part of one or more devices or systems that are physically separate from the display system 100.

The navigation computer 108 is in operable communication, via the communication bus 114, with various data sources including, for example, the navigation databases 106. The navigation computer 108 is used, among other things, to allow the pilot 109 to program a flight plan from one destination to another, and to input various other types of flight-related data. The flight plan data may then be supplied, via the communication bus 114, to the processor 104 and, in some embodiments, to a non-illustrated flight director. In the depicted embodiment, the navigation computer 108 is additionally configured to supply, via the communication bus 114, data representative of the current flight path and the aircraft category to the processor 104. In this regard, the navigation computer 108 receives various types of data representative of the current aircraft state such as, for example, aircraft speed, altitude, position, and heading, from one or more of the various sensors 110. The navigation computer 108 supplies the programmed flight plan data, the current flight path data, and, when appropriate, the aircraft category to the processor 104, via the communication bus 114. The processor 104 in turn supplies appropriate display commands to one or more of the display device 112 so that the programmed flight plan, or at least portions thereof, and the current flight path may be displayed, either alone or in combination, on the display device 112. As was noted above, the processor 104 also receives various types of data, either directly or indirectly, and in turn supplies appropriate display commands to the display device 112. It will be appreciated that at least a portion of these received data may be simultaneously displayed on the display device 112 with the flight plan and/or current flight path. It will additionally be appreciated that all or portions of the data mentioned herein may be entered manually by a user, such as the pilot 109.

The display device 112 is used to display various images and data, in both a graphical and a textual format, and to supply visual feedback to the user 109 in response to the user input commands supplied by the user 109 via the user interface 102. It will be appreciated that the display device 112 may be any one of numerous known displays suitable for rendering image and/or text data in a format viewable by the user 109. Non-limiting examples of such displays include various cathode ray tube (CRT) displays, and various flat panel displays such as, various types of LCD (liquid crystal display) and TFT (thin film transistor) displays. The display may additionally be based on a panel mounted display, a HUD projection, or any known technology. In an exemplary embodiment, the display device 112 includes a panel display. It will additionally be appreciated that the display device 112 may be implemented as either a primary flight display (PFD) or a multi-function display (MFD). Preferably, however, the display device 112 is implemented as a MFD. To provide a more complete description of the method that is implemented by the display system 100, a general description of the display device 112 and its layout will now be provided.

Figure 2:
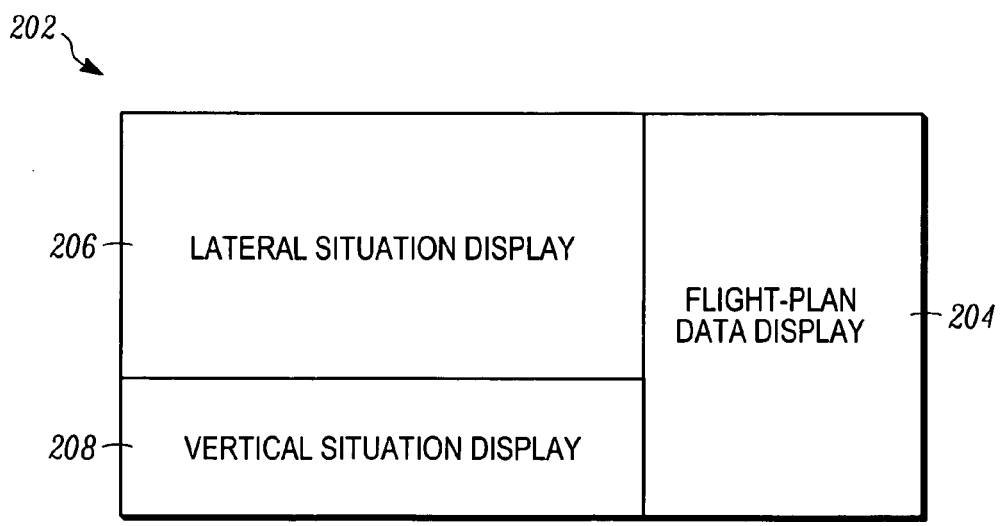
FIG. 2 is a simplified representation of an exemplary display screen that may be used in the system of FIG. 1, which shows the overall layout of the display screen, and on which is various images may be simultaneously displayed.

With reference to FIG. 2, it seen that the display device 112 includes a display area 202 in which multiple graphical and textual images may be simultaneously displayed, preferably in different sections of the display area 202. For example, the display device may display, in various sections of its display area 202, a flight-plan data display 204, a lateral situation display 206, and a vertical situation display 208, simultaneously, alone, or in various combinations. The flight-plan data display 204 provides a textual display of various types of data related to the flight plan of the aircraft. Such data includes, but is not limited to, the flight identifier, and a waypoint list and associated information, such as bearing and time to arrive, just to name a few. It will be appreciated that the flight-plan data display 204 may additionally include various types of data associated with various types of flight hazards.

The lateral situation display 206 provides a two-dimensional lateral situation view or orthographic view of the aircraft along the current flight path, and the vertical situation display 208 provides either a two-dimensional profile vertical situation view or a perspective vertical situation view of the aircraft along the current flight path and/or ahead of the aircraft. While not depicted in FIG. 2, the lateral situation display 206 and the vertical situation display 208 may each selectively display various features including, for example, a top-view aircraft symbol and a side-view aircraft symbol, respectively, in addition to various symbols representative of the current flight plan, various navigation aids, and various map features below and/or ahead of the current aircraft position such as, for example, terrain, navigational aids, airport runways, airport taxiways, airport aprons, and political boundaries. It will be appreciated that the lateral situation display 206 and the vertical situation display 208 preferably use the same scale so that the pilot can easily orient the present aircraft position to either section of the display area 202. It will additionally be appreciated that the processor 104 may implement any one of numerous types of image rendering methods to process the data it receives from the navigation databases 106 and/or the navigation computer 108 and render the views displayed therein.

It was noted above that the flight-related data 204, the lateral situation display 206, and the vertical situation display 208 may be displayed either alone or in various combinations. It is additionally noted that all or portions of the information displayed in the flight-plan data display 204, the lateral display 206, and/or the vertical situation display 206 could instead or additionally be displayed on one or more other non-illustrated display devices. Hence, before proceeding further with the description, it should be appreciated that, for clarity and ease of explanation and depiction, in each of the figures referenced below only the lateral situation display 206 is shown being displayed in the display area 202 of the display device 112.

Figure 3:
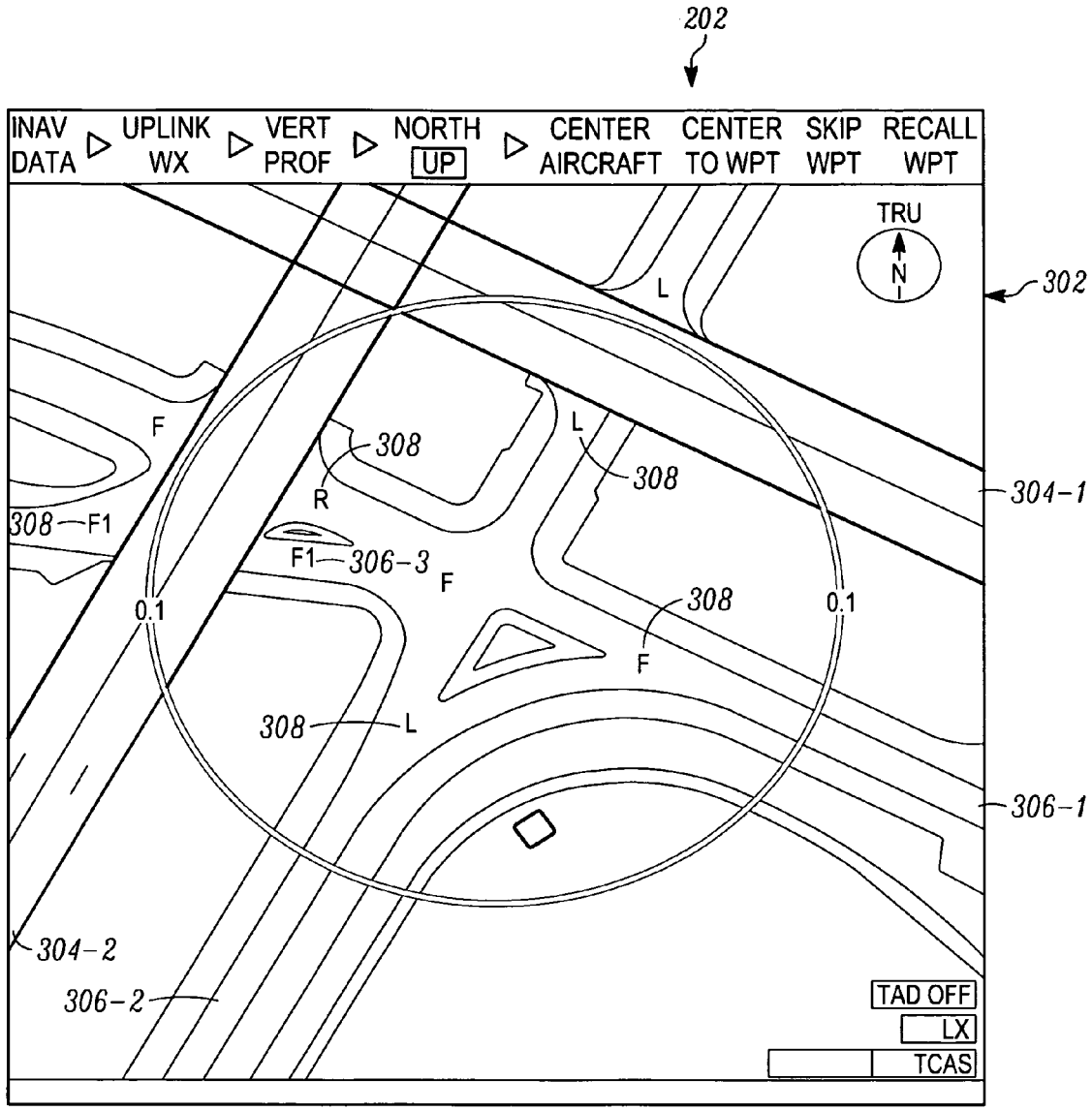
FIG. 3 is an exemplary display screen that depicts a lateral situation view of an airport map.

Returning now to the description, as was previously noted, the processor 104 receives various types of airport-related data from the navigation database 106 and various types of inertial data from the various sensors 110 and supplies image rendering display commands to the display device 112. As shown in FIG. 3, the image rendering display commands supplied from the processor 104 cause the lateral situation display 206, in addition to or instead of one or more of the features previously mentioned, to render a two-dimensional lateral situation view of at least portions of an airport map 302. Alternatively, although not shown, the processor 104 can be configured to supply image rendering display commands that additionally, or instead, cause the vertical situation display 208 to render a perspective view of at least portions of the airport map 302. As is generally known, the airport map 302 typically includes various aircraft pathways, which may include one or more runways 304 (e.g., 304-1, 304-2), one or more taxiways 306 (e.g., 306-1, 306-2, 306-3), and various other runway displaced airport features such as, for example, one or more non-illustrated apron elements.

In addition to providing a lateral situation view of the physical layout of the aircraft pathways 304, 306, the image rendering display commands also cause the display device 112 to render the identifiers associated with at least some of the rendered aircraft pathways. In a particular preferred implementation, and as also shown in FIG. 3, the identifiers 308 are preferably rendered on the surfaces of the aircraft pathways 304, 306. Preferably, the identifiers 308 are rendered on surfaces of the various aircraft pathways 304, 306 such that the identifiers are readable and usable by the flight crew at all map ranges. Various methodologies implemented by the system 100 for attaining these goals will now be described. Before doing so, however, it is noted that in a particular preferred embodiment, the methodologies described herein are applied to only rendering the identifiers 308 associated with airport taxiways 306. It will nonetheless be appreciated that this is merely exemplary of a particular preferred implementation and that the methodologies described herein could be extended, if needed or desired, to other aircraft pathways including, for example, airport runways 304 and apron elements 308, just to name a few.

Industry standard aerodrome databases, such as RTCA documents DO-272A and DO-291, typically define airport map data in the form of individual sections (or segments) for some objects, and in the form of data representative of lines for other objects. The individual segments may take any one of numerous forms, but in a particular preferred embodiment, each of the individual segments is in the form of a polygon. Typically, and as shown more clearly in simplified form in FIG. 4, the aircraft pathways, such as the depicted taxiways 306 (e.g., 306-1, 306-2, 306-3, 306-4), are divided into, and defined by, a plurality of such individual polygonal segments 402 (e.g., 402-1, 402-2, 402-3, . . . 402-9), and more particularly by a plurality of points, or vertices 404, that define each of the individual polygonal segments 402. Thus, the airport map data stored in the navigation databases 106 includes data representative of the plurality of vertices 404 that define the individual polygonal sections 402 of the taxiways 306 (and various other aircraft pathways) such as, for example, latitude and longitude information associated with each vertex 404 for accurately displaying the individual polygonal sections 402. The airport map data additionally includes data representative of the aircraft pathway type (e.g., taxiway, runway, apron, etc.) that each polygonal segment 402 defines, and data representative of the pathway identifier 308. It will be appreciated that the vertices 404 could also be represented in other formats, such as different units, or as relative values from a specific position. It will additionally be appreciated that for clarity of illustration, only the four vertices 404 that define segment 402-1, and partially define segment 404-2, are provided with reference numerals (e.g., 404-1, 404-2, 404-3, 404-4). of the aircraft pathway type In accordance with a particular preferred embodiment, the identifiers 308 associated with the taxiways 306 are rendered on the surfaces of the rendered taxiways 306 and, more particularly, on only selected ones of the individual polygonal sections 402 that define the rendered taxiways 306. The specific individual sections 402 and the specific location on the rendered taxiway surfaces that the associated identifiers 308 are rendered is based on various analyses, including analyses of the above-mentioned industry standard aerodrome databases. For completeness, a brief overview of at least some of the analyses will now be discussed.

Figure 4:
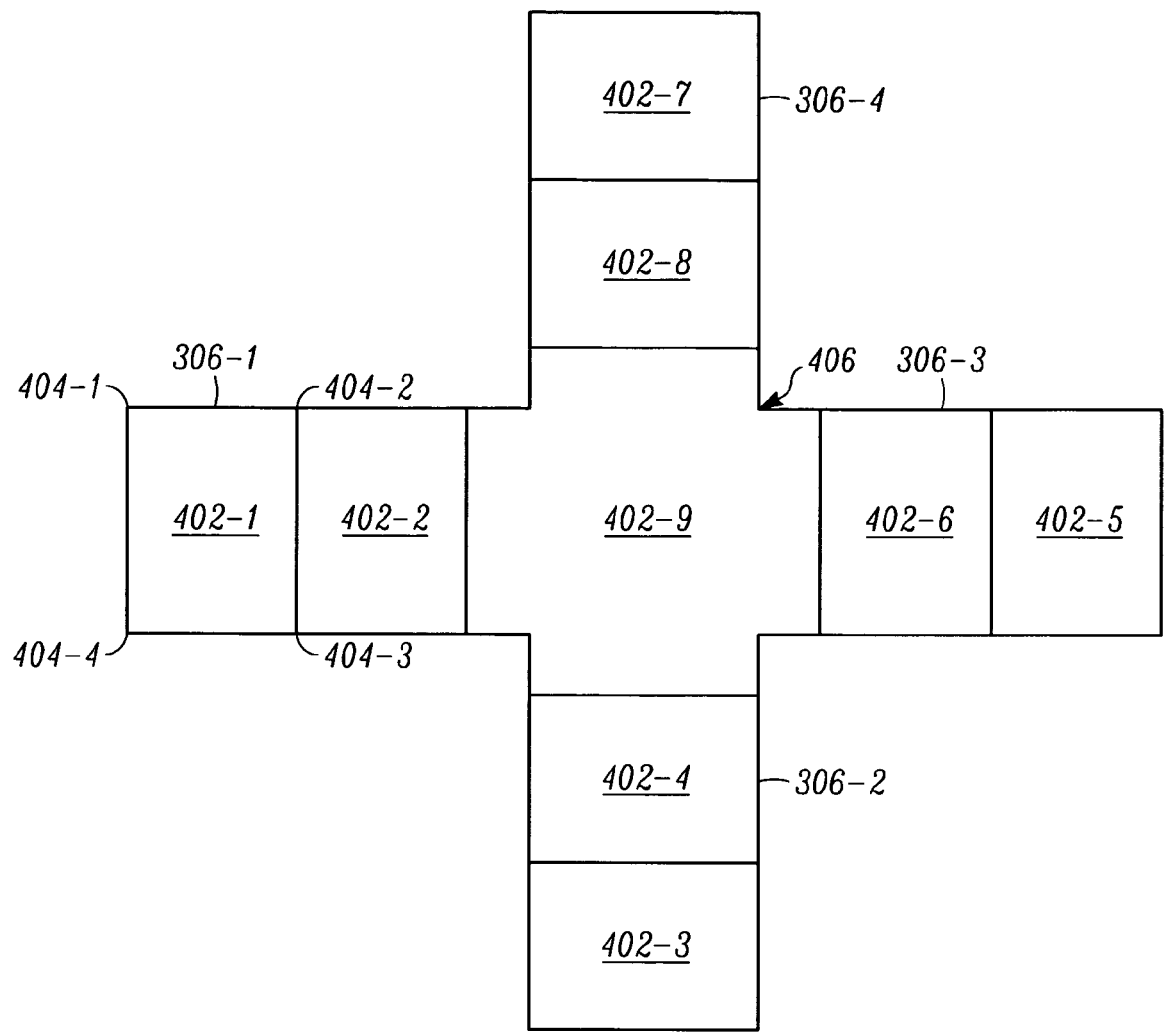
FIG. 4 is a simplified representation of individual taxiway polygonal segments that define a plurality of taxiways.

As depicted in FIG. 4, when the four taxiways 306-1, 306-2, 306-3, 306-4 come together, a taxiway intersection 406, which is represented in FIG. 4 by individual polygonal segment 402-9, is formed. Because the individual polygonal segment 402-9 defines a taxiway intersection 406, it is really a part of all four taxiways 306-1, 306-2, 306-3, 306-4. Thus, it would be logical to assume that four different identifiers 308 would be associated with this polygonal segment 402-9. However, in industry standard aerodrome databases, only a single identifier 308 is associated with a taxiway intersection 406. This could potentially create confusion when the associated identifier 308 is rendered on the display 112. Moreover, actual taxiway intersections at airports are not labeled with taxiway signs. Rather, when an aircraft is at an intersection, the flight crew will see only directions for which way to turn to get to another taxiway.

Based on the above, it was determined that taxiway intersections 406 should not be rendered with the identifier 308 assigned to it in industry standard aerodrome databases. Moreover, additional analysis revealed that relatively long, straight taxiways 306 should have minimum labeling. Because a single taxiway 306 can be defined by many individual polygon segments 402 or a single, relatively large polygonal segment 402, it is desirable to prevent redundant labeling. Hence, it was determined that if adjoining taxiway polygon segments 402 have the same identifier 308, then the identifier 308 need not be rendered. It is preferable to only show labeling for taxiway elements that are adjacent to taxiway intersections or adjacent to other objects (e.g., runways, aprons, etc.).

In view of the foregoing, the identifiers 308 associated with the rendered taxiways 306, in accordance with a particular preferred embodiment, are rendered on individual taxiway polygonal segments 402 that adjoin another aircraft pathway, such as another taxiway 306, a runway 304, a runway displaced area, an apron element, or a stopway, just to name a few. However, as will be described further below, there may be some exceptions to this generalization. In addition, the identifiers 308, when rendered thereon, are preferably rendered at a position that corresponds to, or at least substantially corresponds to, the centroid of the individual polygonal segments 402. It will be appreciated that the centroid of the individual polygonal segments 402 of the rendered taxiway 306 can be determined using any one of numerous processes and/or methods. For example, the centroid of the individual segments 402 can be determined from the above-mentioned latitude and longitude information associated with the plurality of vertices 404 that define each of the individual polygonal segments 402. In addition, it will be appreciated that although, as is depicted in FIG. 3, the taxiway guidance lines are preferably not rendered, in an alternative embodiment the taxiway guidance lines may be rendered simultaneously with the identifiers 308.

The industry standard aerodrome databases do not specifically identify if an individual polygonal segment 402 is an intersection 406. Thus, the system 100 preferably determines the frequency and location of the taxiway identifiers 308 in accordance with two processes. The first process determines the location at which the taxiway identifiers 308 may be rendered, which individual polygonal segments 402 define a taxiway intersection 406, and which individual taxiway polygonal segments 402 are adjoining segments 402. The second process then determines which on which of the individual polygonal segments 402 the associated identifier should be rendered. It will be appreciated that although the processes are described herein as being conducted separately, these processes could be implemented as a single process.

Figure 5:
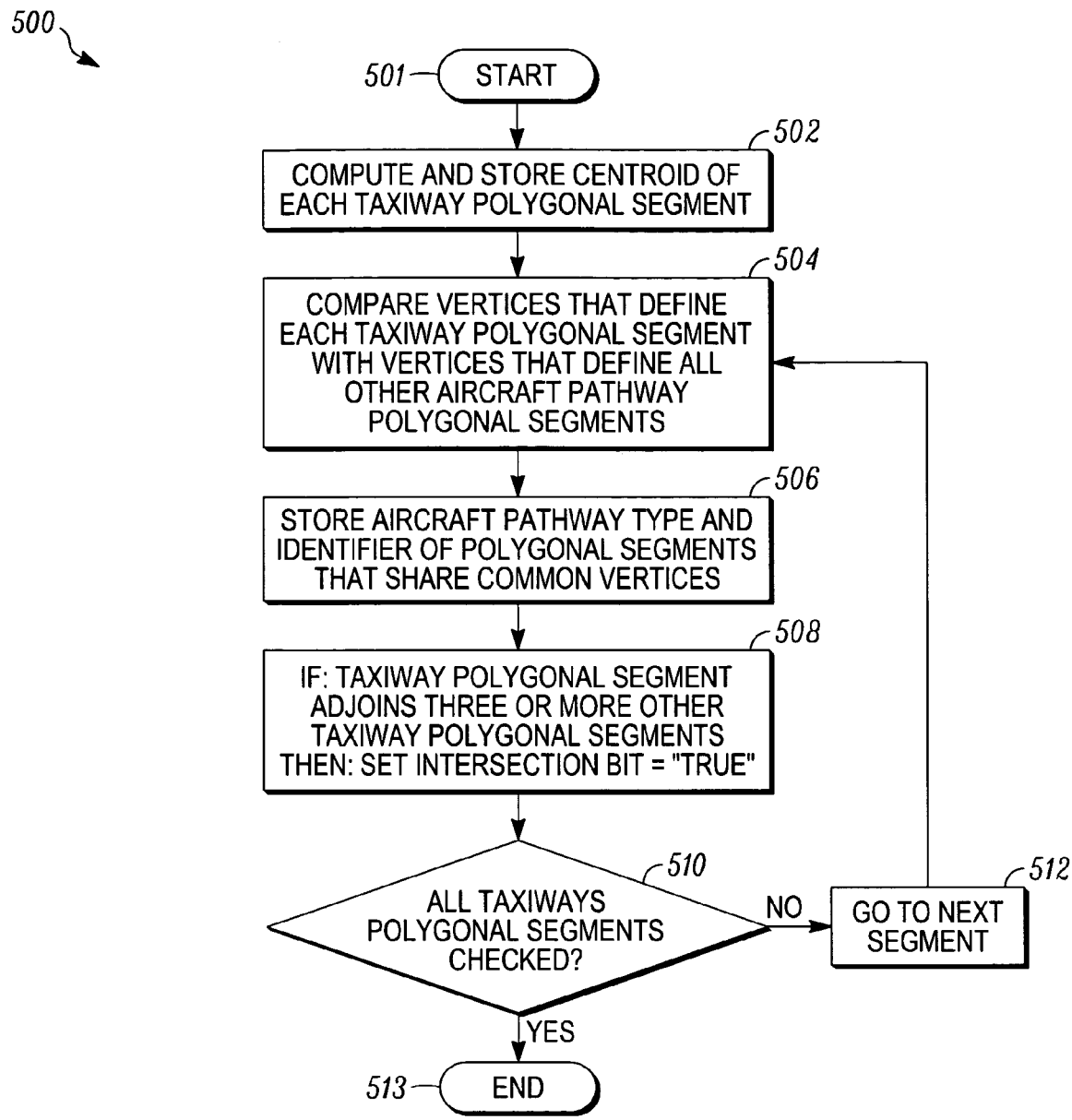
FIG. 5 is a flowchart depicting a process for determining the centroid of an individual taxiway segment, whether an individual taxiway polygonal segment defines an intersection, and which individual taxiway polygonal segments are adjoining segments.

Referring first to FIG. 5, the first process 500, which is a process for determining the centroid of each individual taxiway segment 402, whether individual taxiway polygonal segments 402 define a taxiway intersection 406, and which individual taxiway polygonal segments 402 are adjoining segments 402, will now be described. The exemplary process 500 is depicted in flowchart from in FIG. 5, and is merely exemplary of any one of numerous ways of depicting and implementing the overall process to be described. With this background in mind, it is noted that the numerical parenthetical references in the following description refer to like steps in the flowchart depicted in FIG. 5.

Turning now to the description of the first process 500, it is seen that the centroid of each individual taxiway polygonal segment 402 is first computed (502) and stored. As noted above, this may be done using any one of numerous known processes and thus, for clarity and brevity, need not and will not be described. The set of vertices 404 that define a single taxiway polygonal segment 402 are then compared to the vertices 404 that define all of the other aircraft pathway polygonal segments that define the aerodrome (504). If the vertices 404 that define the single taxiway polygonal segments match any of the vertices 404 that define any of the other pathway polygonal segments, the aircraft pathway type and identifier of the matching aircraft pathway polygonal segment are stored (506). After comparing the single taxiway polygonal segment 402 to the other aircraft pathway polygonal segments that define the aerodrome, a determination is made as to which taxiway polygonal segments 402 define a taxiway intersection 406. In accordance with the depicted embodiment, a taxiway polygonal segment 402 defines a taxiway intersection 406 if it adjoins three or more other taxiway polygon segments 402. In such instances, an intersection bit associated with the taxiway polygonal segment 402 is set to "TRUE" (508). Thereafter, the previously described steps are performed for each taxiway polygonal segments 402 associated with the aerodrome.

Before proceeding further, it will be appreciated that the process 500 could implement any one of numerous methods to determine whether the vertices 404 that define polygonal segments "match." For example, it may be that the resolution of that associated data is such that an exact match may not be possible. In such instances, a tolerance, such as within 0.5 meters or similar measure of tolerance, can be used to define what constitutes a "match." It will additionally be appreciated that the above-described process 500 is preferably conducted prior to loading the associated airport map data into the navigation databases 106. In doing so, the data are readily available for use by the system 100. Alternatively, the process 500 could be conducted by the system 100 upon retrieval of an individual airport map 302, or upon power-up of the system 100, just to name a few alternatives. In any case, the system 100 is configured to use the data to render the appropriate taxiway identifiers 308, preferably in accordance with the second process, which will now be described.

Figure 6A:
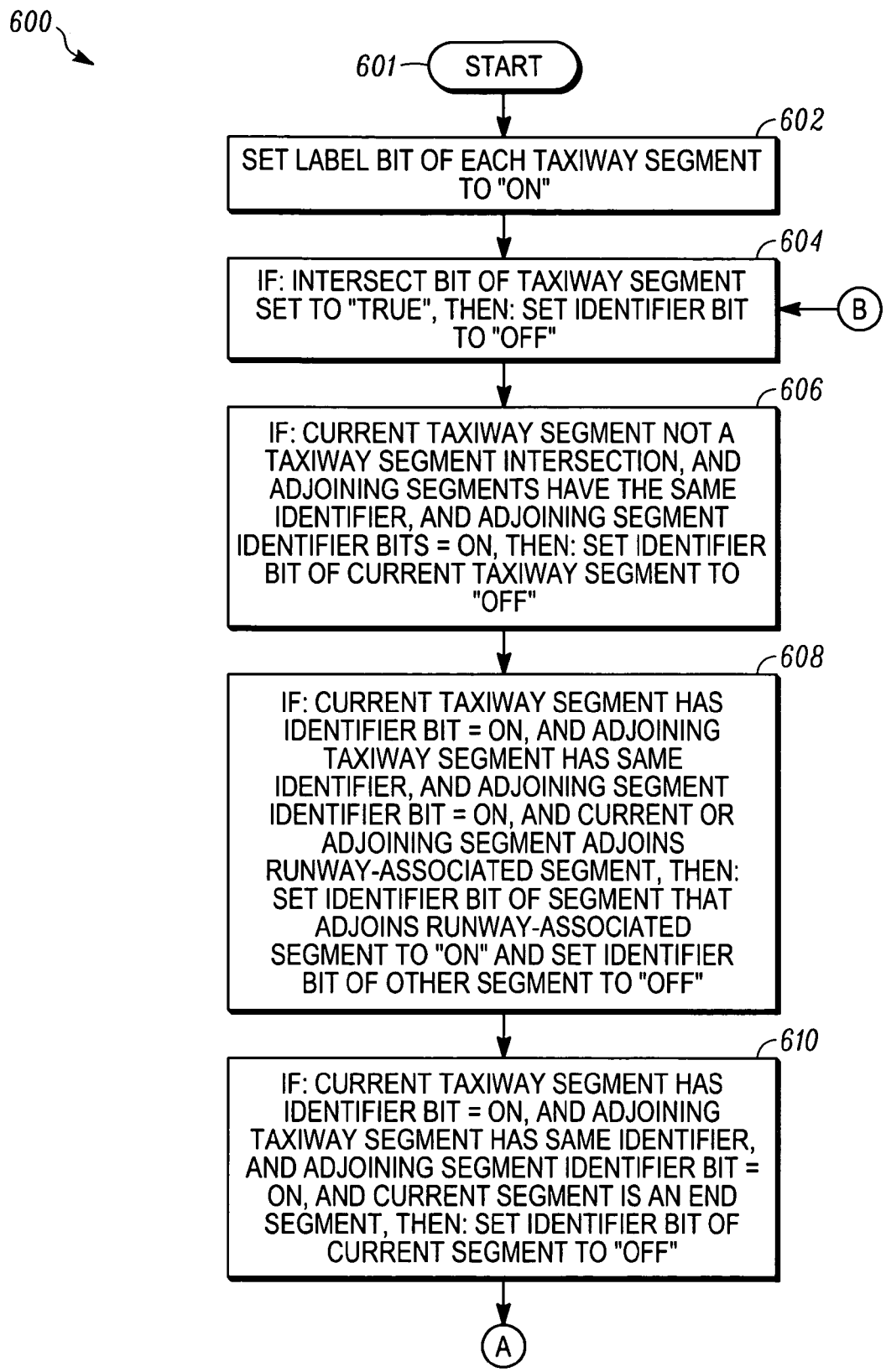
FIGS. 6A and 6b depict a flowchart depicting a process for rendering taxiway identifiers on selected individual polygonal segments.
Figure 6B:
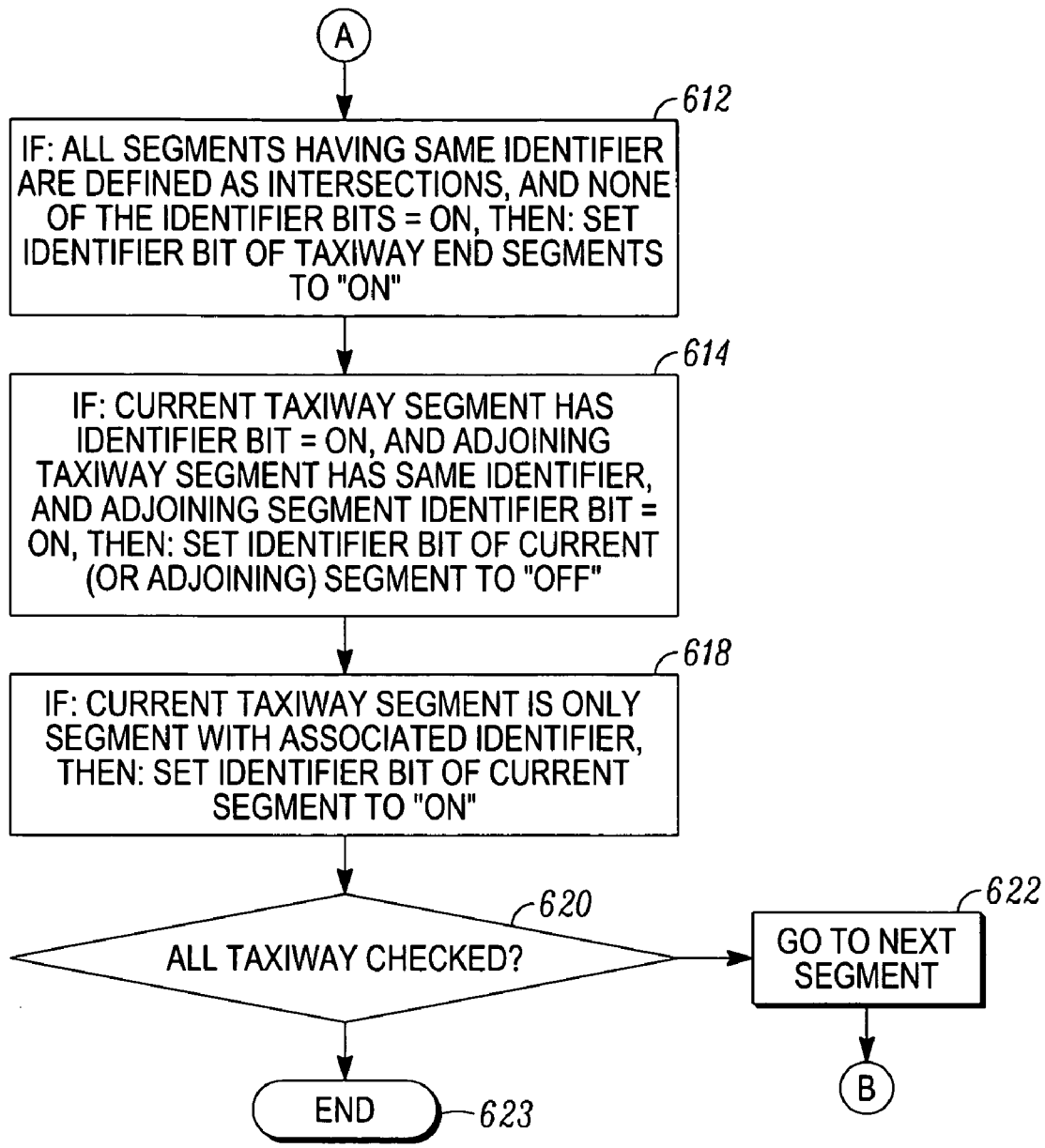

As depicted in FIG. 6, the preferred process 600 of rendering the taxiway identifiers 308 uses logic to determine if each taxiway polygonal segment 402 has particular characteristics relative to each of the aircraft pathway segments that it adjoins, which was preferably determined in the previously-described process 500. Depending on the determination, an identifier bit associated with the taxiway polygonal segment 402 will be set to either "OFF" or "ON." It is noted that the identifier bit is used by the processor 104 to determine whether the identifier 308 associated with a taxiway polygonal segment 402 should be rendered on the segment 402. If a taxiway polygonal segment identifier bit is set to "OFF," the identifier 308 will not be rendered thereon. If, however, the identifier bit is set to "ON," the identifier 308 will be rendered thereon, and preferably, as noted above, at the centroid of the taxiway polygonal segment 402. It is noted that the identifier bit associated with each taxiway polygonal segment 402 is initially set to "ON," and is subsequently set to "OFF," remains set to "ON" or, after being set to "OFF" is subsequently set back to "ON," depending on its particular determined relative characteristics.

With the above background, it is seen that if a taxiway polygonal segment 402 is defined as a taxiway intersection 406 (604), its identifier bit is initially set to "OFF." If a taxiway polygonal segment 402 is not defined as a taxiway intersection 406, it is compared to two adjoining aircraft pathway polygonal segments. If the two adjoining polygonal segments are taxiway polygonal segments AND have the same identifier 308 associated therewith AND have their identifier bits set to "ON," then all three polygonal segments are part of the same taxiway 306 and the identifier bit of the current taxiway polygonal segment 402 is set to "OFF" (606). If the current taxiway polygonal segment 402 has its identifier bit set to "ON" AND an adjoining taxiway polygonal segment 402 has the same identifier 308 AND the adjoining taxiway polygonal segment 402 has its identifier bit is set to "ON" AND if the current or adjoining taxiway polygonal segment 402 adjoins a runway-associated polygonal segment (e.g., a polygonal segment associated with a runway, a runway displaced area, or a stopway), then the identifier bit of the taxiway polygonal segment 402 that adjoins the runway-associated polygonal segment remains set to "ON" and the other taxiway polygonal segment identifier bit is set to "OFF" (608). If the current taxiway polygonal segment 402 has its identifier bit set to "ON" AND an adjoining taxiway polygonal segment 402 has the same identifier 308 AND the adjoining taxiway polygonal segment 402 has its identifier bit is set to "ON" AND the current taxiway polygonal segment 402 is an end polygon (end of taxiway), then the identifier bit of the current taxiway polygonal segment 402 is set to "OFF" (610). If the current taxiway polygonal segment 402 has its identifier bit set to "ON" AND an adjoining taxiway polygonal segment 402 has the same identifier 308 AND the adjoining taxiway polygonal segment 402 has its identifier bit is set to "ON", then the identifier bit of the current (or adjoining) taxiway polygonal segment 402 is set to "OFF" 614. If the current taxiway polygonal segment 402 is the only taxiway polygonal segment 402 with its associated identifier, then the identifier bit of the current taxiway polygonal segment 402 is set to "ON," regardless of whether or not it is an intersection 406 (618).

As noted above, the identifier bits of taxiway polygonal segments 402 that are defined as taxiway intersections 406 are initially set to "OFF." However, if all of the taxiway polygon polygonal segments 402 having the same identifier are defined as intersections 406 and, after the previously described comparisons, none of the identifier bits of the taxiway polygonal segments 402 are set to "ON," then identifier bits for the end taxiway polygonal segments 402 for that taxiway are set to "ON" (612).

Figure 7:
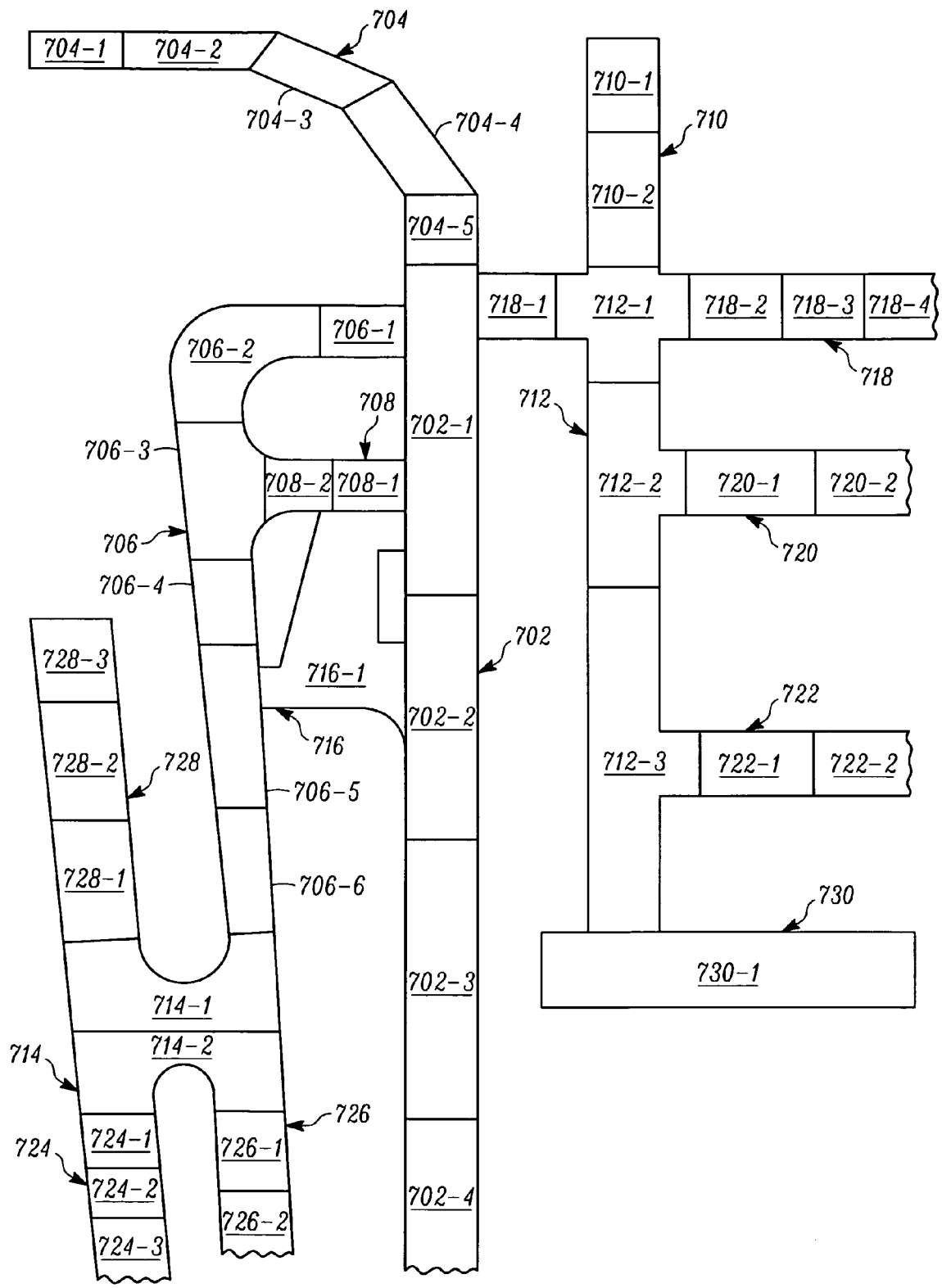
FIG. 7 is a simplified representation of a runway and a plurality of taxiways, and the individual polygonal segments that comprise each.
Figure 8:
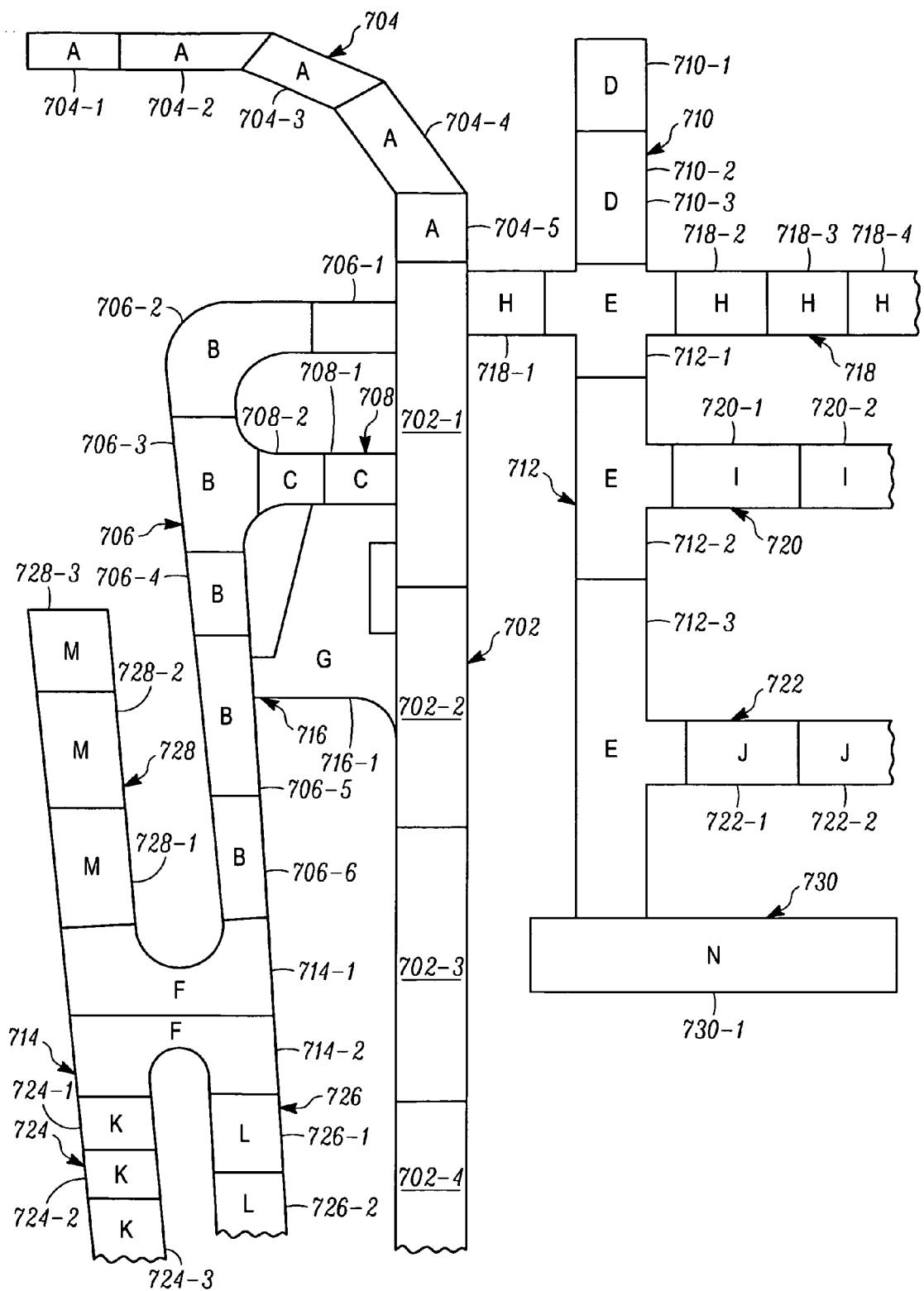
FIG. 8 depicts which of the individual segments depicted in FIG. 7 will be rendered with taxiway identifiers, using the processes of FIGS. 5, 6A and 6B.

To illustrate the exemplary processes 500, 600 described above, reference should now be made to FIGS. 7-9. Referring first to FIG. 7, a representation of a runway 702, and fourteen taxiways 704, 706, 708, 710, 712, 714, 716, 718, 720, 722, 724, 726, 728, and 730 that are to be rendered in the display area 202 are shown. As noted above, the runway 702 and taxiways 704-730 are each defined by a plurality of segments. In particular, the runway 702 is defined by four rendered segments 702-1, 702-2, 702-3, and 702-4, the first taxiway 704 is defined by four rendered segments 704-1, 704-2, 704-3, 704-4, the second taxiway 706 is defined by six rendered segments 706-1, 706-2, 706-3, 706-4, 706-5, 706-6, the third taxiway 708 is defined by two rendered segments 708-1, 708-2, the fourth taxiway 710 is defined by two rendered segments 710-1, 710-2, the fifth taxiway 712 is defined by three rendered segments 712-1, 712-2, 712-3, the sixth taxiway 714 is defined by two rendered segments 714-1, 714-2, the seventh taxiway 716 is defined by one rendered segment 716-1, the eighth taxiway 718 is defined by four rendered segments 718-1, 718-2, 718-3, 718-4, the ninth taxiway 720 is defined by two rendered segments 720-1, 720-2, the tenth taxiway 722 is defined by two rendered segments 722-1, 722-2, the eleventh taxiway 724 is defined by three rendered segments 724-1, 724-2, 724-3, the twelfth taxiway 726 is defined by two rendered segments 726-1, 726-2, the thirteenth taxiway 728 is defined by three rendered segments 728-1, 728-2, 728-3, and the fourteenth taxiway 730 is defined by one rendered segment 730-1. Moreover, as is depicted in FIG. 8, the identifier associated first taxiway 704 is "A," the identifier associated with the second taxiway 706 is "B," the identifier associated with the third taxiway 708 is "C," the identifier associated with the fourth taxiway 710 is "D," the identifier associated fifth taxiway 712 is "E," the identifier associated with the sixth taxiway 714 is "F," the identifier associated with the seventh taxiway 716 is "G," the identifier associated with the eighth taxiway 718 is "H," the identifier associated with the ninth taxiway 720 is "I," the identifier associated with the tenth taxiway 722 is "J," the identifier associated eleventh taxiway 724 is "K," the identifier associated with the twelfth taxiway 726 is "L," the identifier associated with the thirteenth taxiway 728 is "M," and the identifier associated with the fourteenth taxiway 730 is "N."

Figure 9:
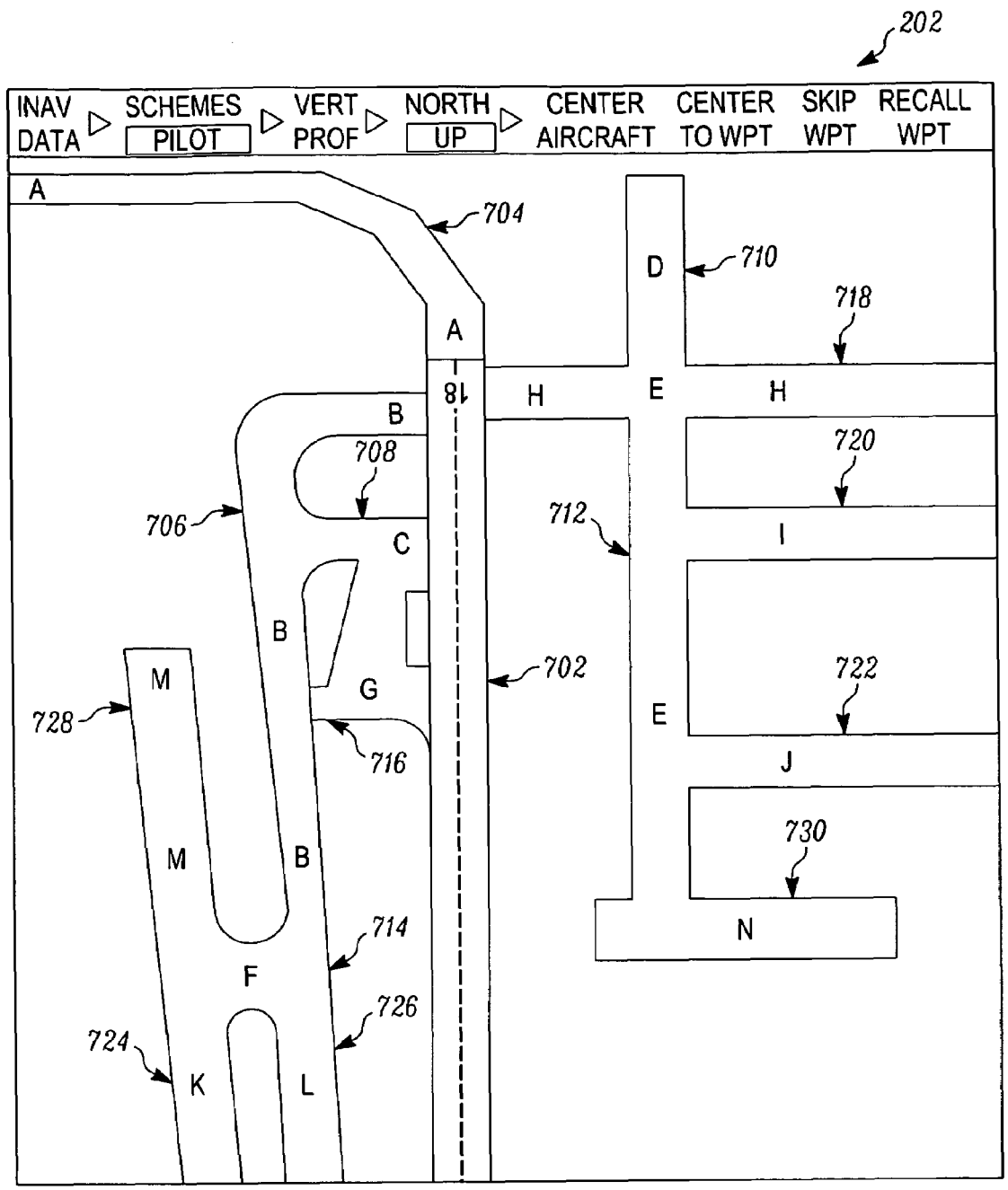
FIG. 9 depicts how the runway, taxiways, and identifiers would be rendered on an aircraft flight deck display device.

When the previously described processes 500, 600 are implemented, and the runway 702 and taxiways 704-730 are rendered in the display area 202, the identifiers associated with the taxiways 704-730 are rendered, as shown in FIG. 9. Upon implementation of the logic depicted in FIG. 6, it is seen that, in general, identifiers 308 are not rendered on the taxiway segments that define a taxiway intersection, identifiers 308 are rendered on taxiway segments that adjoin another aircraft pathway (e.g., runway, taxiway, apron element, etc.), and identifiers 308 are not rendered on at least one of the rendered taxiway segments that adjoin a rendered taxiway segment on which the identifier 308 is rendered. However, as was noted above, as the logic depicted in FIG. 6 and described above dictates, and as will now be described, there are some exceptions to this general scheme.

In particular, it may be seen that taxiway segments 706-3, 706-5, 712-1, 712-2, 712-3, 714-1, 714-2, and 716-1 are each taxiway intersections 406. Thus, the intersect bits of each of these segments 706-3, 706-5, 712-1, 712-2, 712-3, 714-1, 714-2, and 716-1 is set to "TRUE," and the identifier bits of each of these segments 706-3, 706-5, 712-1, 712-2, 712-3, 714-1, 714-2, and 716-1 is initially set to "OFF." However, upon implementation of the logic depicted in FIG. 6 and described above, it is noted that the identifier bits of segments 712-1, 712-3, 714-1, and 716-1 are subsequently set to "ON." This is a result of the logic depicted in blocks 612, 614, and 618. Hence, as FIG. 9 depicts, the identifiers associated with these taxiways 712, 714, 716, are rendered in these particular segments 712-1, 712-3, 714-1, and 716-1, even though these segments are intersections 406. Only the end segments 704-1, 704-5 of the first taxiway 704 are rendered with the appropriate identifier ("A"). For the second taxiway 706, it is seen that, because of the logic depicted in block 608, the appropriate identifier ("B") is rendered on the segment 706-1 that adjoins the runway displaced area of the runway 702, but not on the segment 706-2 that adjoins the segment 706-3 that was identified as defining an intersection 406. Moreover, for the fourth taxiway 710, the appropriate identifier ("D") is not rendered on the segment 710-1, even though this is an end segment, but is rendered on the segment 710-2 that adjoins the segment 712-1 that was identified as defining an intersection 406. This result flows from the logic depicted in block 610.

Figure 10:
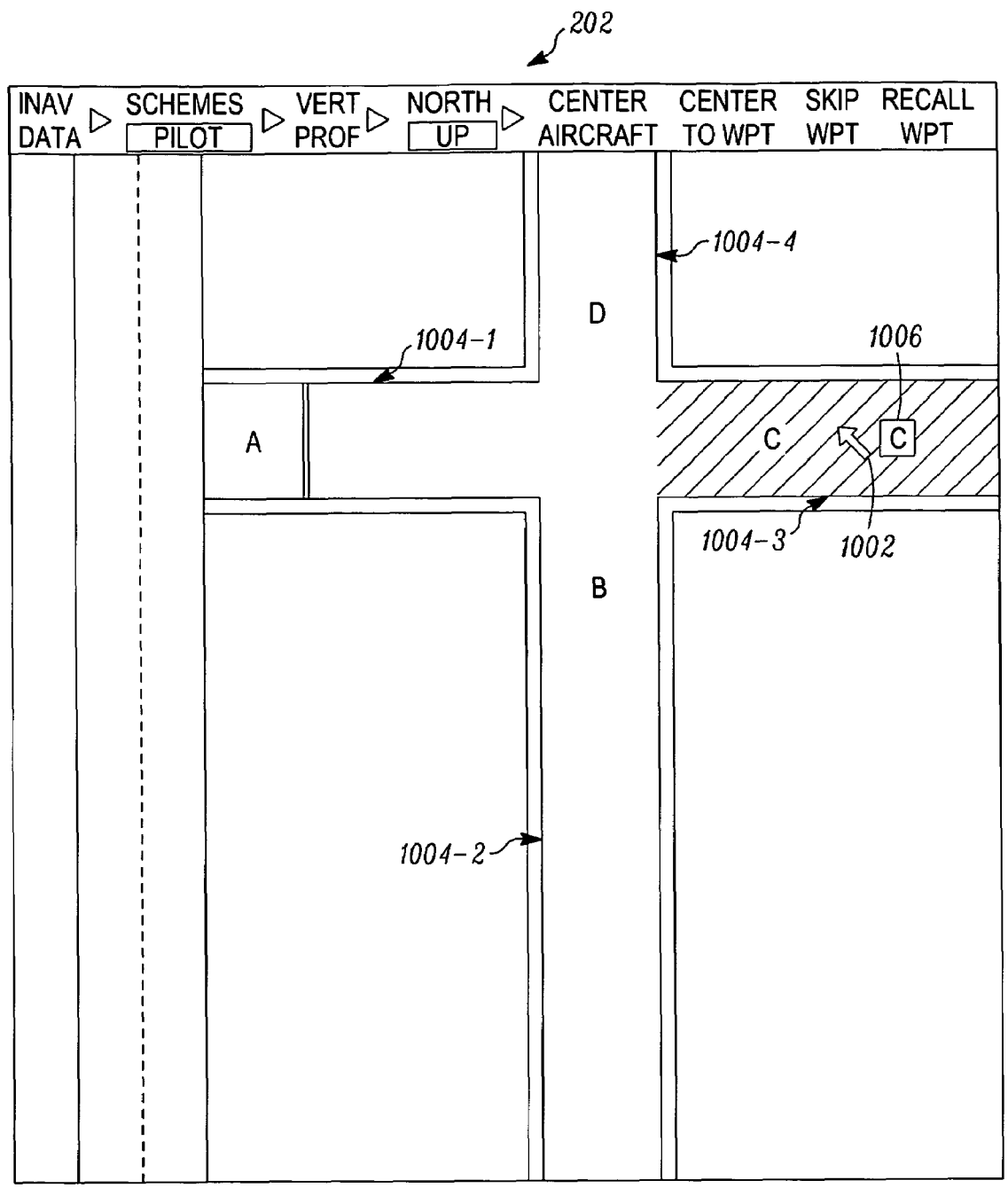
FIG. 10 depicts a runway, taxiways, and identifiers rendered on an aircraft flight deck display device, with one of the taxiways highlighted.

In addition to rendering identifiers associated with aircraft pathways, the system 100 is also preferably configured to implement various other functions. For example, the system 100 is preferably configured to selectively highlight various airport features that are currently being rendered, to implement an electronic search function, and to render the present position of the aircraft on the ground. In a particular preferred embodiment the highlighting function is implemented in response to placement of a displayed cursor on or near a rendered feature. More specifically, and with reference now to FIG. 10, it is seen that when the cursor 1002 is placed over taxiway 1004-3, that taxiway 1004-3 is highlighted by, for example, rendering it in a different color than the other aircraft pathways. In addition to highlighting the taxiway 1004-3 (or other object), an additional identifier 1006 is rendered in the display area 202. In the depicted embodiment the additional taxiway identifier 1006 is rendered next to the cursor 1002. It will be appreciated, however, that this is merely exemplary, and that the additional taxiway identifier 1006 could be rendered in any one of numerous other regions of the display 112.

Figure 11:
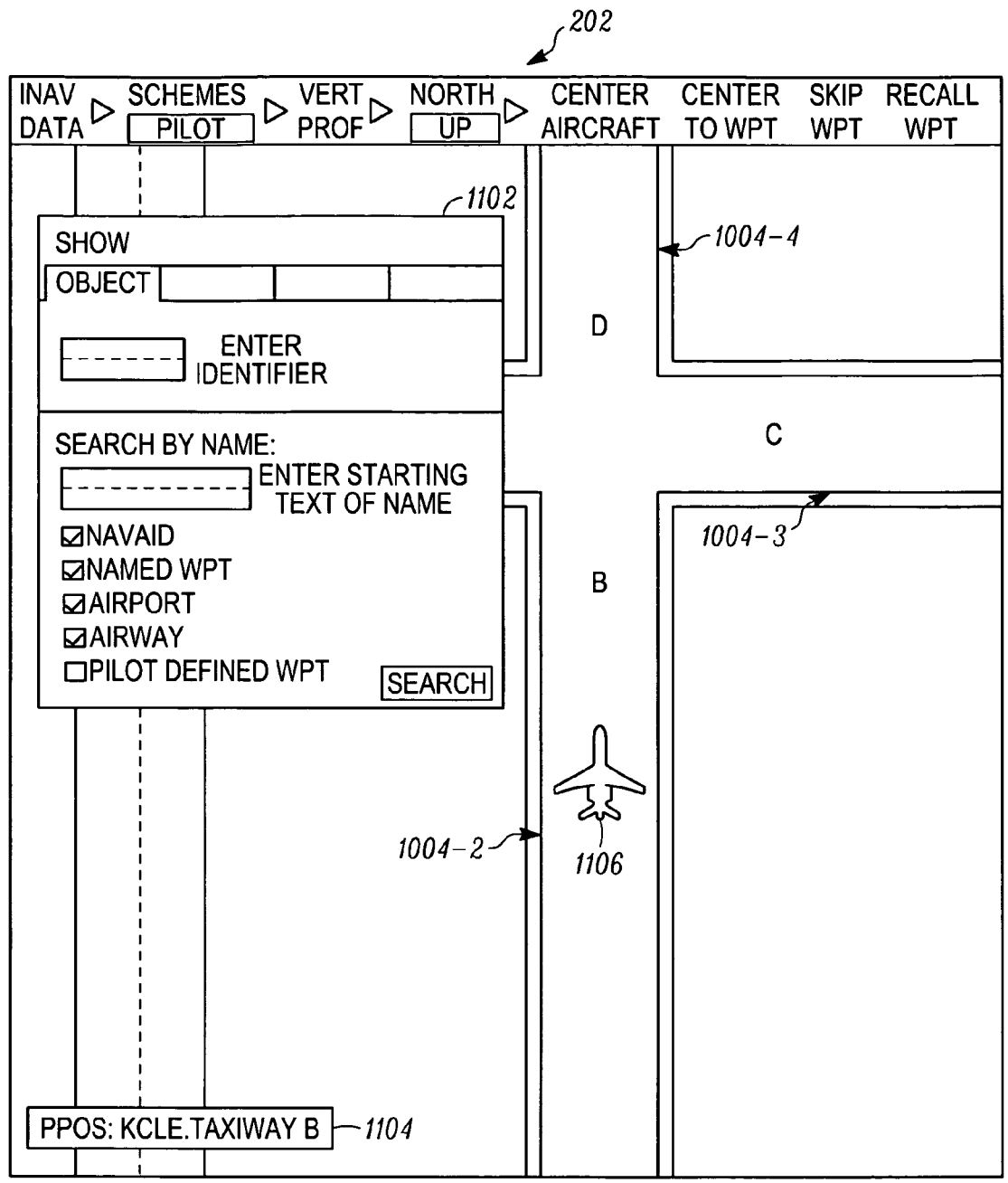
FIG. 11 depicts a runway, taxiways, identifiers, a graphical user interface useful for conducting an electronic search function of an aerodrome, and an aircraft present position icon and textual readout rendered on an aircraft flight deck display device.

The electronic search function implemented by the system 100 provides the capability to electronically search for a specific taxiway, runway, apron element, or other object. In a particular preferred embodiment, which is shown in FIG. 11, a graphical user interface 1102 is selectively displayed, in response to a user supplied command. In the depicted embodiment, the graphical user interface 1102 is implemented as a drop-down menu. It will be appreciated, however, that this is merely exemplary of any one of numerous suitable user interfaces 1102 that may be implemented. The interface 1102 allows the user 109 to enter the name of a specific object. Upon entry, either in whole or in part, of the object name, system 100 will cause the object to be rendered, preferably in a highlighted manner, in the display area 202. As regards the present position functionality, and with continued reference to FIG. 11, it is seen that the system 100 preferably renders a textual readout 1104 of the present aircraft position. In the depicted embodiment, the textual readout 1104 is rendered in the lower left corner of the display 112. It will be appreciated, however, that this is merely exemplary, and that the textual readout 1104 could be rendered in any one of numerous other regions of the display 112. In addition, as FIG. 11 further depicts, the system 100 preferably renders an aircraft icon 1106 in the display area 202 at the location representative of the present aircraft position.

Figure 12:
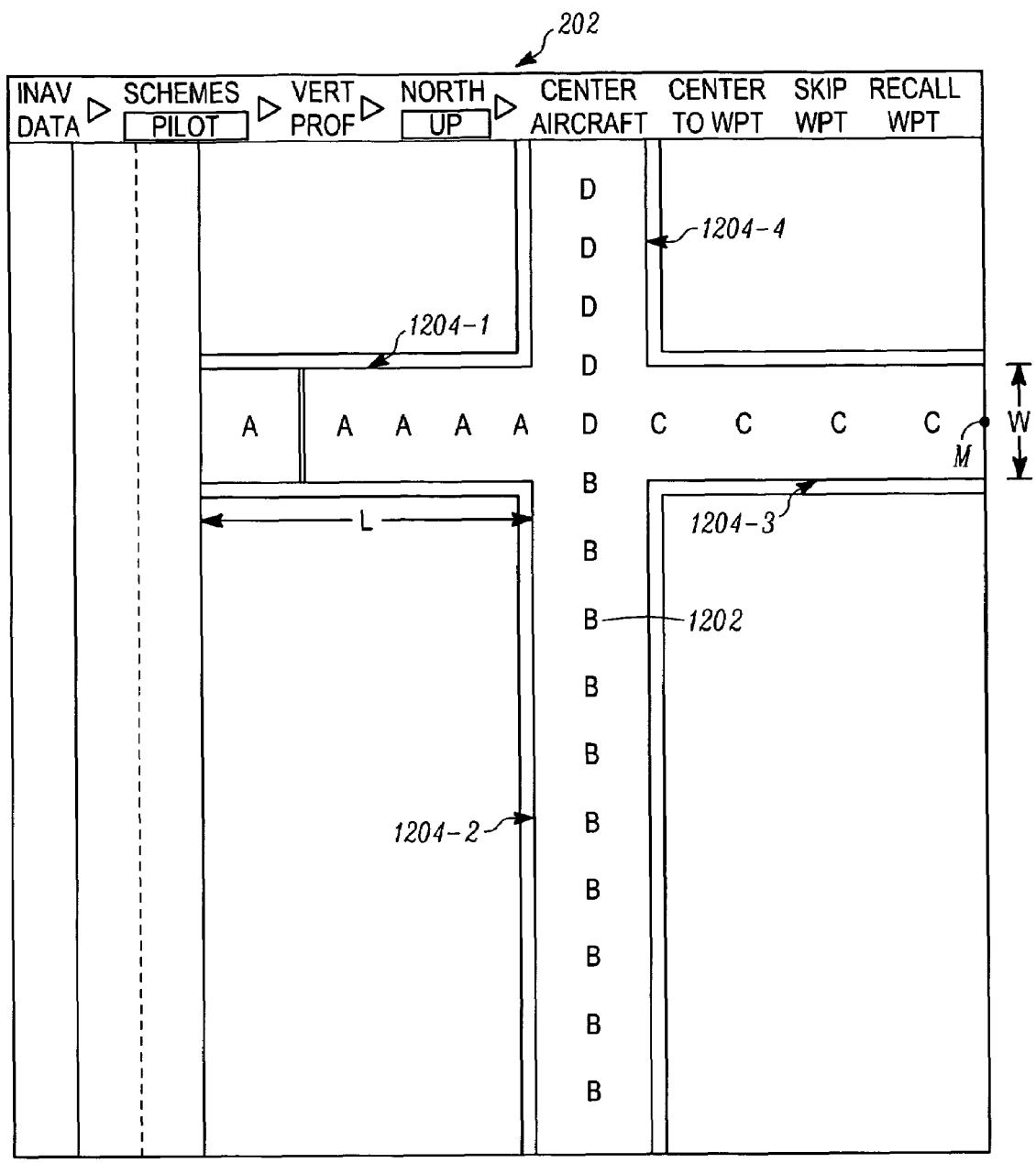
FIG. 12 depicts a runway, taxiways, and identifiers rendered on an aircraft flight deck display device, in accordance with an exemplary alternative embodiment.

As was previously noted, the above-described method for rendering aircraft pathway identifiers is merely exemplary of one particular preferred embodiment, and that the system 100 could be configured to implement various other methods for rendering aircraft pathway identifiers. For example, in one particular alternative embodiment, and as shown more clearly in FIG. 12, the system 100 is configured to periodically render the aircraft pathway identifiers 1202 along the length (L) of the aircraft pathways, which in the depicted embodiment are taxiways 1204 (e.g., 1204-1, 1204-2, 1202-3, 1202-4), and at a position that corresponds to, or at least substantially corresponds to, a midpoint (M) of the width (W) of the rendered taxiways 1204. The width midpoint (M) of the rendered taxiways 1204 can be determined using any one of numerous processes and/or methods. For example, the width midpoint (M) of the rendered taxiways 1204 corresponds to, or at least substantially corresponds to, the position of the taxiway guidance line, which, as was previously noted, is preferably not rendered, and is thus not depicted in FIG. 12. It will be appreciated that the positions of the taxiway guidance lines are preferably included in the airport map data. Alternatively, the width midpoint (M) of the rendered taxiways 1204 may be determined from the previously-mentioned latitude and longitude data that are associated with each of the individual segments that define the rendered taxiways 1204. It will be appreciated that although the taxiway guidance lines are preferably not rendered, in an alternative embodiment, and as was also previously noted, the taxiway guidance lines may be rendered simultaneously with the identifiers 1202.

No matter the particular method that is used to determine the width midpoint (M) of the rendered taxiways 1204, or whether the taxiway guidance lines are rendered, the system 100, when implementing this alternative embodiment, determines the frequency that the identifiers 1202 associated with each aircraft taxiway 1204 should be rendered on the aircraft pathway surface. In particular, the frequency that an identifier 1202 associated with a particular taxiway 1204 is rendered is a function of the length of each of the individual segments that define the rendered taxiway 1204, versus the displayed map range. In general, as the displayed map range increases, the frequency that an identifier 1202 is rendered decreases. The frequency at which an identifier 1202 associated with a particular taxiway 1202 is rendered is preferably determined in accordance with one of two processes, each of which will now be described in more detail.

Figure 13:
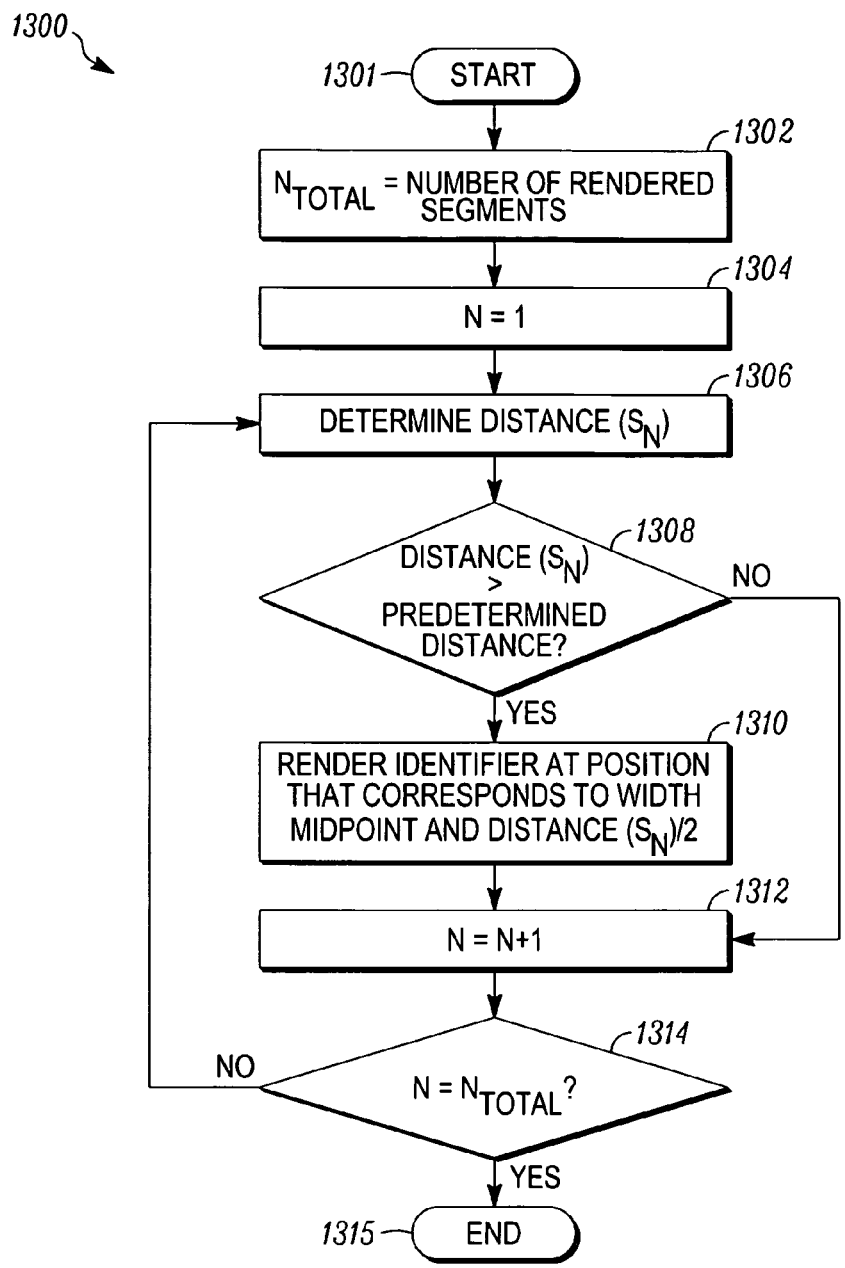
FIG. 13 is a flowchart depicting a process for determining the frequency at which a taxiway identifier will be rendered on an associated taxiway.
Figure 14:
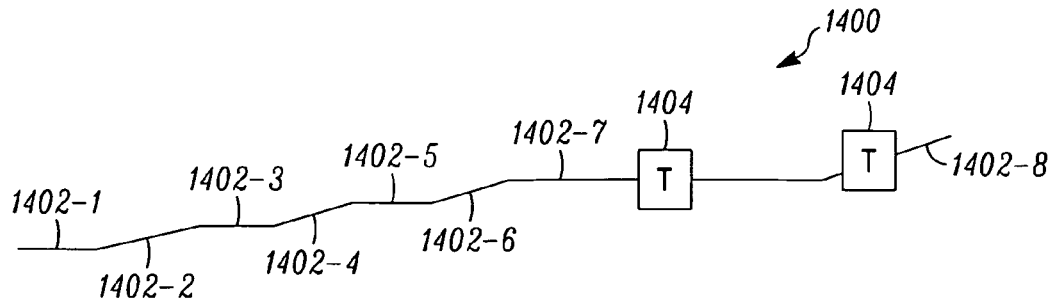
FIG. 14 is a simplified representation of a taxiway and identifiers, rendered in accordance with the process of FIG. 13.

Referring first to FIGS. 13 and 14, a method for determining the frequency at which an identifier 1202 associated with a rendered taxiway 1204 is rendered on the surface thereof, according to a first alternative embodiment, will now be described. The exemplary method 1300 is depicted in flowchart form in FIG. 13, and a simplified representation of a rendered taxiway 1400 is depicted in FIG. 14. It will be appreciated that the method 1300 depicted in FIG. 13 is merely exemplary of any one of numerous ways of depicting and implementing the overall methodology to be described. Moreover, it is noted that the rendered taxiway 1400 is depicted in FIG. 14 such that the individual segments 1402 (e.g., 1402-1, 1407-2, 1402-3 . . . 1402-8) that define the taxiway 1400 are each represented by an individual line segment. It will additionally be appreciated that the lines depicted in FIG. 14 could represent the position of the taxiway guidelines associated with each of the individual segments 1402 that make up the taxiway 1400.

With the above background in mind, the methodology 1300 will now be described. In doing so, it is noted that the numerical parenthetical references in this description refer to like steps in the flowchart depicted in FIG. 13. Turning now to the description, it is seen that the total number of individual taxiway segments 1402 that are rendered is determined (1302) and then a variable (N) is initialized (1304). This variable is used to determine when the process should end. For the particular taxiway 1400 depicted in FIG. 14, eight individual segments 1402 define the rendered taxiway 1400, thus $N_{TOTAL}$ is set equal to eight. Next, the distance that the first individual taxiway segment 1402-1 represents (e.g., DISTANCE ($S_1$)) is determined (1306). Then, the distance that the first individual taxiway segment represents is compared to a predetermined distance to determine whether the distance is greater than the predetermined distance (1308). If the distance that the first individual taxiway segment represents exceeds the predetermined distance, the identifier associated with the taxiway 1400 is rendered on the surface of the first individual taxiway segment 1402-1 (1310). If the distance does not exceed the predetermined distance, then the identifier associated with the taxiway 1400 is not rendered on the surface of the first individual taxiway segment 1402-1. In both instances, the tracking variable (N) is then incremented (1312) and is compared to the total number of rendered segments ($N_{TOTAL}$) to determine whether the process 1300 has been implemented for each of the individual taxiway segments 1402 (1314). In the depicted embodiment it is seen that this results in the identifier 1404 associated with the taxiway 1400 being rendered on only the last two individual taxiway segments 1402-7, 1402-8.

Figure 15A:
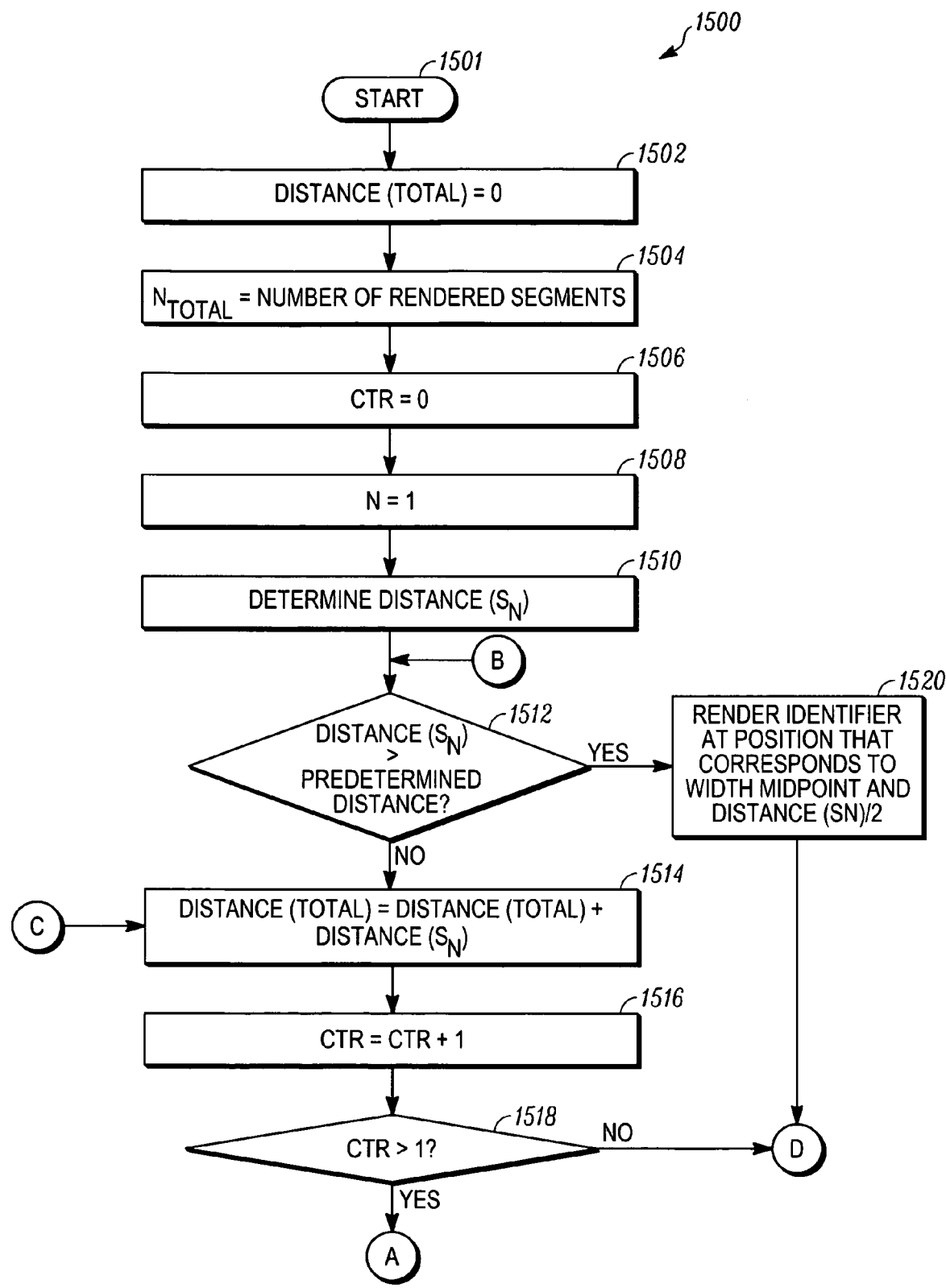
FIGS. 15A and 15B are flowcharts that depict an alternative process for determining the frequency at which taxiway identifiers are rendered on an associated taxiway.
Figure 15B:
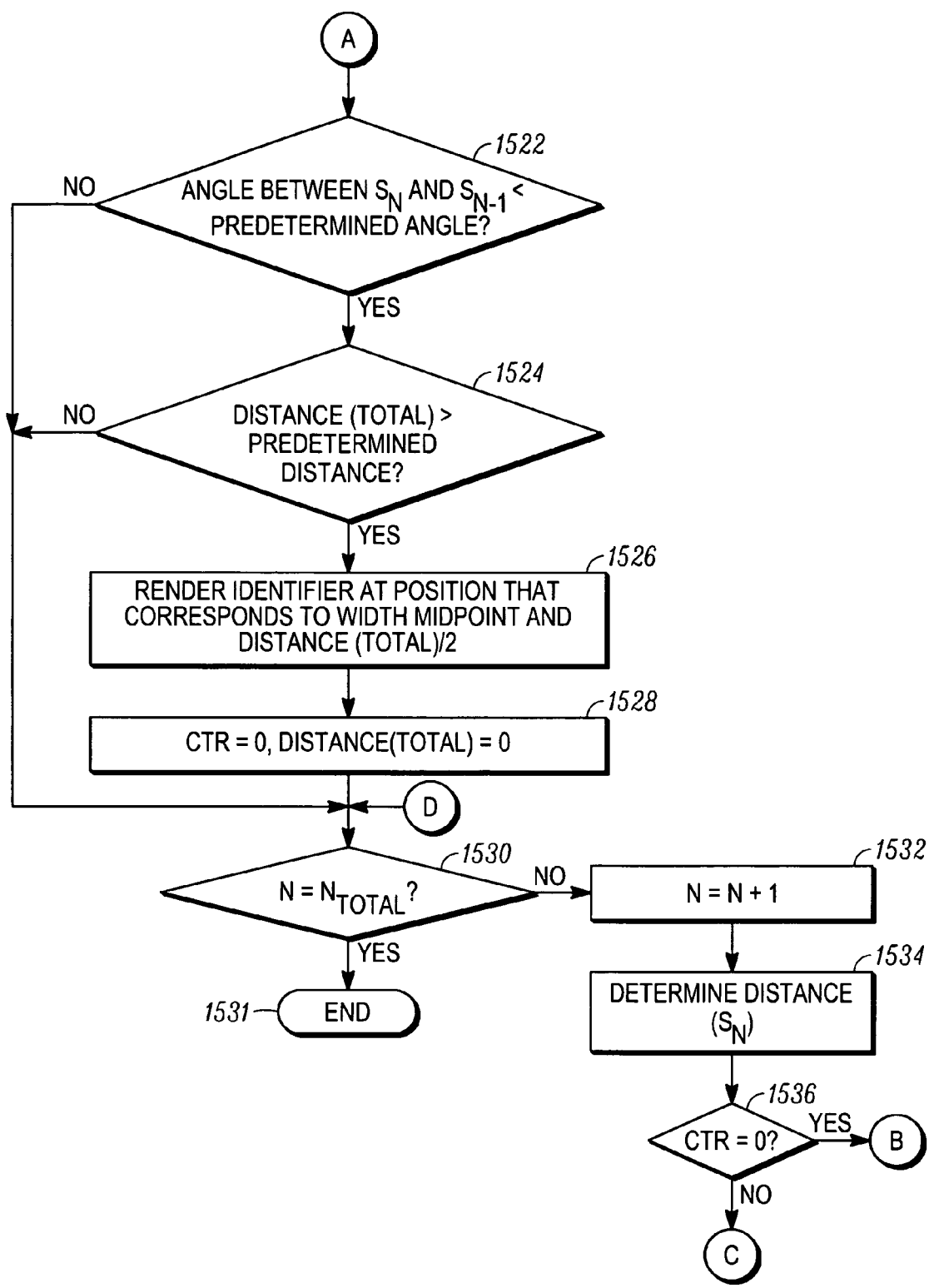
Figure 16:
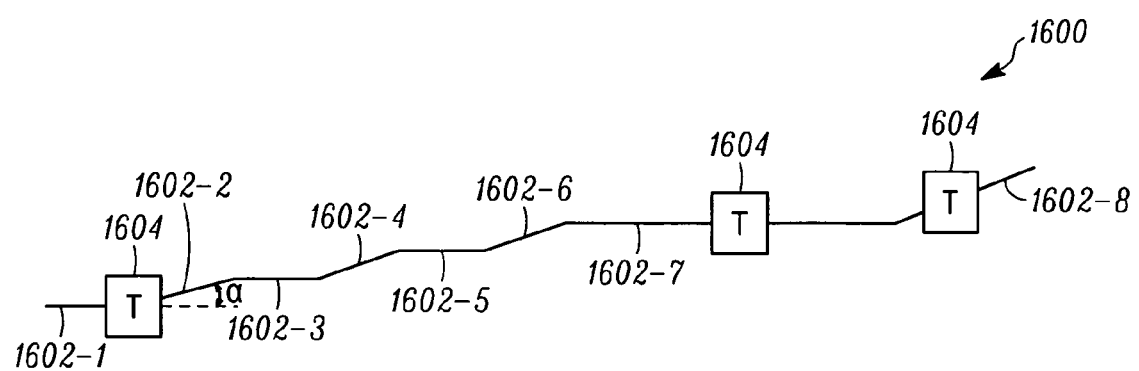
FIG. 16 is a simplified representation of a taxiway and identifiers, rendered in accordance with the process of FIGS. 15A and 15B.

Referring now to FIGS. 15A, 15B, and 16, yet another alternative method for determining the frequency at which an identifier associated with a rendered taxiway is rendered on the surface thereof will now be described. As before, the exemplary method 1500 is depicted in flowchart form in FIGS. 15A and 15B, and a simplified representation of a rendered taxiway 1600 is depicted in FIG. 16. It will be appreciated that the method 1500 depicted in FIGS. 15A and 15B is merely exemplary of any one of numerous ways of depicting and implementing the overall methodology to be described. Moreover, it is noted that, as with the previously described embodiment, the rendered taxiway 1600 is depicted in FIG. 16 such that the individual segments 1602 (e.g., 1602-1, 1607-2, 1602-3 . . . 1602-8) that define the taxiway 1600 are each represented by an individual line segment, and that the lines could represent the position of the taxiway guidelines associated with each of the individual segments 1602 that make up the taxiway 1600.

With the above background in mind, the methodology 1500 will now be described. As before, it is noted that the numerical parenthetical references in this description refer to like steps in the flowchart depicted in FIGS. 15A and 15B. Turning now to the description, it is seen that a total distance variable (DISTANCE (TOTAL)) is initialized to zero (1502), the total number of individual taxiway segments 1602 that are rendered is determined (1504), a counter (CTR) is initialized (1506), and a variable (N) is initialized (1508). As before, the variable (N) is used to determine when the process 1500 should end. For the particular taxiway 1600 depicted in FIG. 16, eight individual segments 1602 define the rendered taxiway 1600, thus $N_{TOTAL}$ is set equal to eight.

Following the above-described variable initializations, the distance (DISTANCE ($S_N$)) that the current individual taxiway segment ($S_N$) represents is determined (1510). This distance is then compared to a predetermined distance to determine whether it is greater than a predetermined distance (1512). If the distance that the current individual taxiway segment ($S_N$) represents exceeds the predetermined distance, then, as in the previously described embodiment, the identifier associated with the taxiway 1600 is rendered on the surface of the current individual taxiway segment (1520). The tracking variable (N) is then compared to the total number of rendered segments ($N_{TOTAL}$) to determine whether the process 1500 has been implemented for each of the individual taxiway segments (1530). If not, the tracking variable (N) is incremented (1532), the distance that the next individual taxiway segment ($S_N$) represents is determined (1534), and the counter (CTR) is compared to zero (1536). If the counter is zero, the process returns to the step of comparing the distance to the predetermined distance (1512). If the counter is not zero, the process returns to a step that, as will now be described, sums the determined distances (1514).

If, converse to that described above, the distance that the current individual taxiway segment (DISTANCE ($S_N$)) represents does not exceed the predetermined distance, then the distance that the current taxiway segment represents (DISTANCE ($S_N$)) is summed with the current total distance (DISTANCE (TOTAL)) (1514), and the counter (CTR) is incremented (1516). If the counter (CTR) is not greater than one, which means the distances represented by two or more segments have not been summed together, the tracking variable (N), as previously described, is compared to the total number of rendered segments ($N_{TOTAL}$) to determine whether the process 1500 has been implemented for each of the individual taxiway segments (1530). If this is not the case, and as was also previously described, the tracking variable (N) is incremented (1532), the distance that the next individual taxiway segment ($S_N$) represents is determined (1534), and the counter (CTR) is compared to zero (1536). If the counter is zero, the process returns to the step of comparing the distance to the predetermined distance (1512). If the counter is not zero, which it should not be in this case, the process returns to the step that sums the determined distances (1514).

If, when the counter (CTR) is compared to one (1518), it is determined to be greater than one, the process then compares the angle between the current individual taxiway segment ($S_N$) and the previous individual taxiway segment ($S_{N-1}$) with a predetermined angle (1522). If the angle between the current and previous individual taxiway segments is less than the predetermined angle, and the current total distance (DISTANCE (TOTAL)) exceeds the predetermined distance (1524), then the identifier associated with the taxiway 1600 is rendered on the surface of the current individual taxiway segment (1526). More specifically, the identifier associated with the taxiway 1600 is rendered at a position that corresponds to the width midpoint of the taxiway 1600 and half of the current total distance (DISTANCE (TOTAL)/2). Thereafter, the counter (CTR) and the current total distance (DISTANCE (TOTAL)) are both reinitialized to zero (1528), the tracking variable (N) is incremented (1532), the distance that the next individual taxiway segment ($S_N$) represents is determined (1534), and the counter (CTR) is compared to zero (1536). Since, in this instance the counter is zero, the process returns to the step of comparing the distance to the predetermined distance (1512).

If, rather than being less than the predetermined angle, the angle between the current ($S_N$) and previous ($S_{N-1}$) individual taxiway segments exceeds the predetermined angle (1522), or if it is not and the current total distance (DISTANCE (TOTAL)) does not exceed the predetermined distance (1524), the tracking variable (N) is compared to the total number of rendered segments ($N_{TOTAL}$) to determine whether the process 1500 has been implemented for each of the individual taxiway segments (1530). If not, then the tracking variable (N) is incremented (1532), the distance that the next individual taxiway segment ($S_N$) represents is determined (1534), and the counter (CTR) is compared to zero (1536). If the counter is zero, the process returns to the step of comparing the distance to the predetermined distance (1512). If the counter is not zero, the process returns to the step that sums the determined distances (1514).

When the above-described process is implemented for the taxiway 1600 represented in FIG. 16, after the variables are initialized, the distance that the first individual taxiway segment 1602-1 (DISTANCE ($S_1$)) represents is determined and is found to be less than the predetermined distance. Thus, the current total distance (DISTANCE (TOTAL)) is set equal to the distance that the first individual taxiway segment 1602-1 (DISTANCE ($S_1$)) represents, and the counter (CTR) is incremented. Because the counter is now equal to 1, and thus not greater than 1, no identifier is rendered. Moreover, because the tracking variable (N=1) is less than the total number of rendered segments ($N_{TOTAL}$=8), the tracking variable (N) is incremented (N=2), the distance that the second individual taxiway segment 1602-2 represents (DISTANCE ($S_2$)) is determined and, because the counter does not equal zero, this distance is summed with the previous total. As a result, the current total distance is now equal to the sum of the distances represented by the first and second segments (e.g., DISTANCE (TOTAL)=DISTANCE ($S_1$)+DISTANCE ($S_2$)).

After the current total distance is updated, the counter (CTR) is then incremented (CTR=2). Because the counter is now greater than 1, the angle between the first and second taxiway segments 1602-1, 1602-2 is compared to the predetermined angle. In the depicted embodiment, this angle (α) is less than the predetermined angle, and the current total distance (DISTANCE (TOTAL)) is greater than the predetermined distance. Thus, the identifier 1604 associated with the taxiway 1600 is rendered at a position that corresponds to the width midpoint and half of the current total distance (DISTANCE (TOTAL)/2). Thereafter, the counter (CTR) is reinitialized to zero, the tracking variable (N) is incremented, the distance that the next individual taxiway segment ($S_3$) represents is determined, and the counter (CTR) is compared to zero. The process then repeats for the remainder of the individual taxiway segments that define the rendered taxiway 1600. In the depicted embodiment, it is seen that this results in the identifier 1604 associated with the taxiway 1600 being rendered on the last two individual taxiway segments 1602-7, 1602-8. This is because these segments 1602-7, 1602-8 each represent distances that are greater than the predetermined distance.

It will be appreciated that in each of the previously described embodiments the predetermined distance may vary, but is a function of the displayed map range and is preferably selected to sufficiently prevent cluttering of the rendered identifiers. It will additionally be appreciated that in the latter embodiment the predetermined angle may vary, but is preferably selected such that there is not a sufficiently large angle between adjacent segments. In a particular exemplary embodiment, a 20-degree angle is selected as the predetermined angle.

In addition to the two alternative embodiments that were described immediately above, the system 100 be configured to render taxiway identifiers according various other alternative configurations. Moreover, these various other alternative configurations could be implemented alone or in combination with the above-described highlight, electronic search, and present position features. Each of the various other alternative taxiway identifier rendering configurations will now be briefly described.

Figure 17:
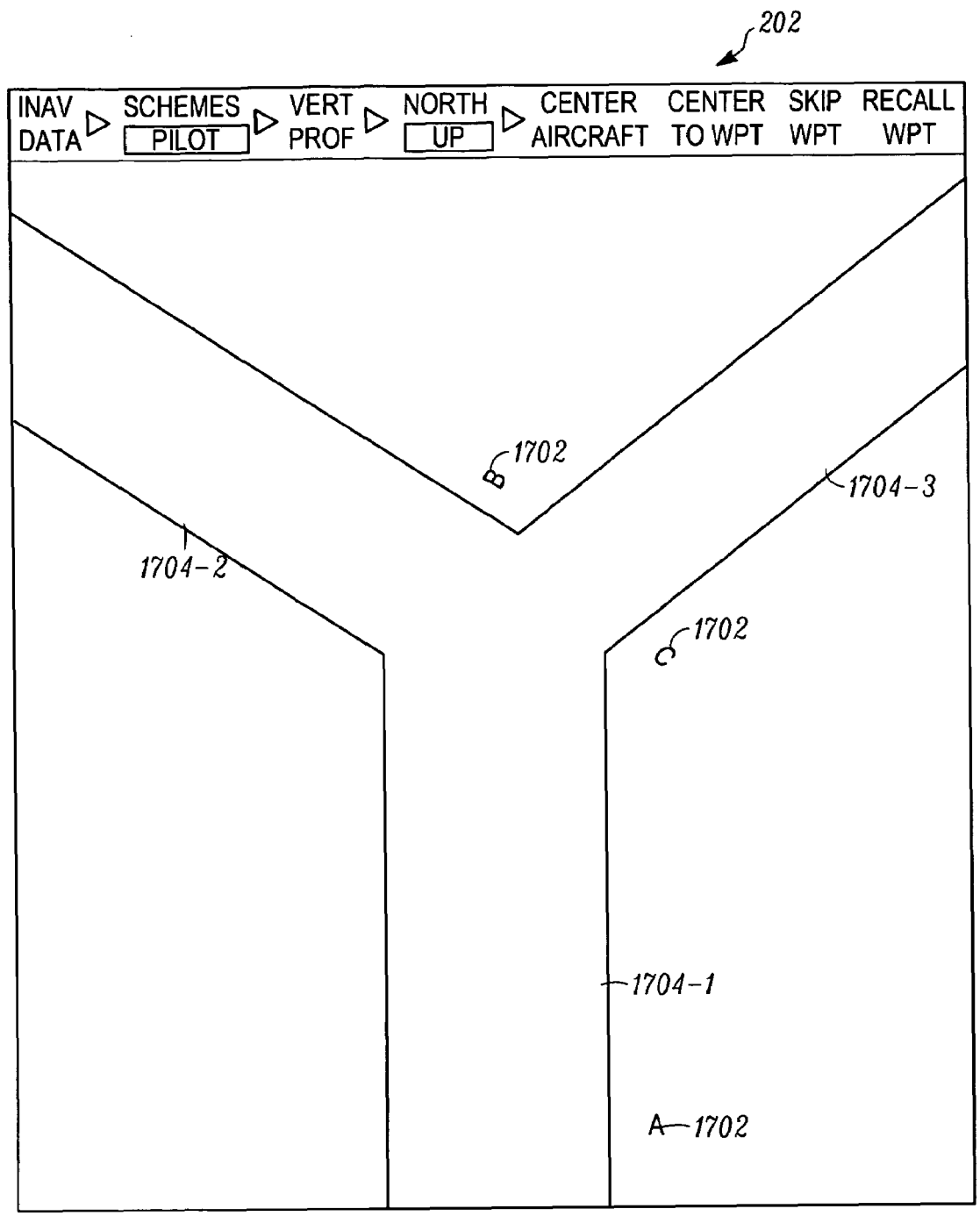
FIGS. 17-21 each depict various alternative implementations for rendering taxiways and associated identifiers on an aircraft flight deck display device.
Figure 18:
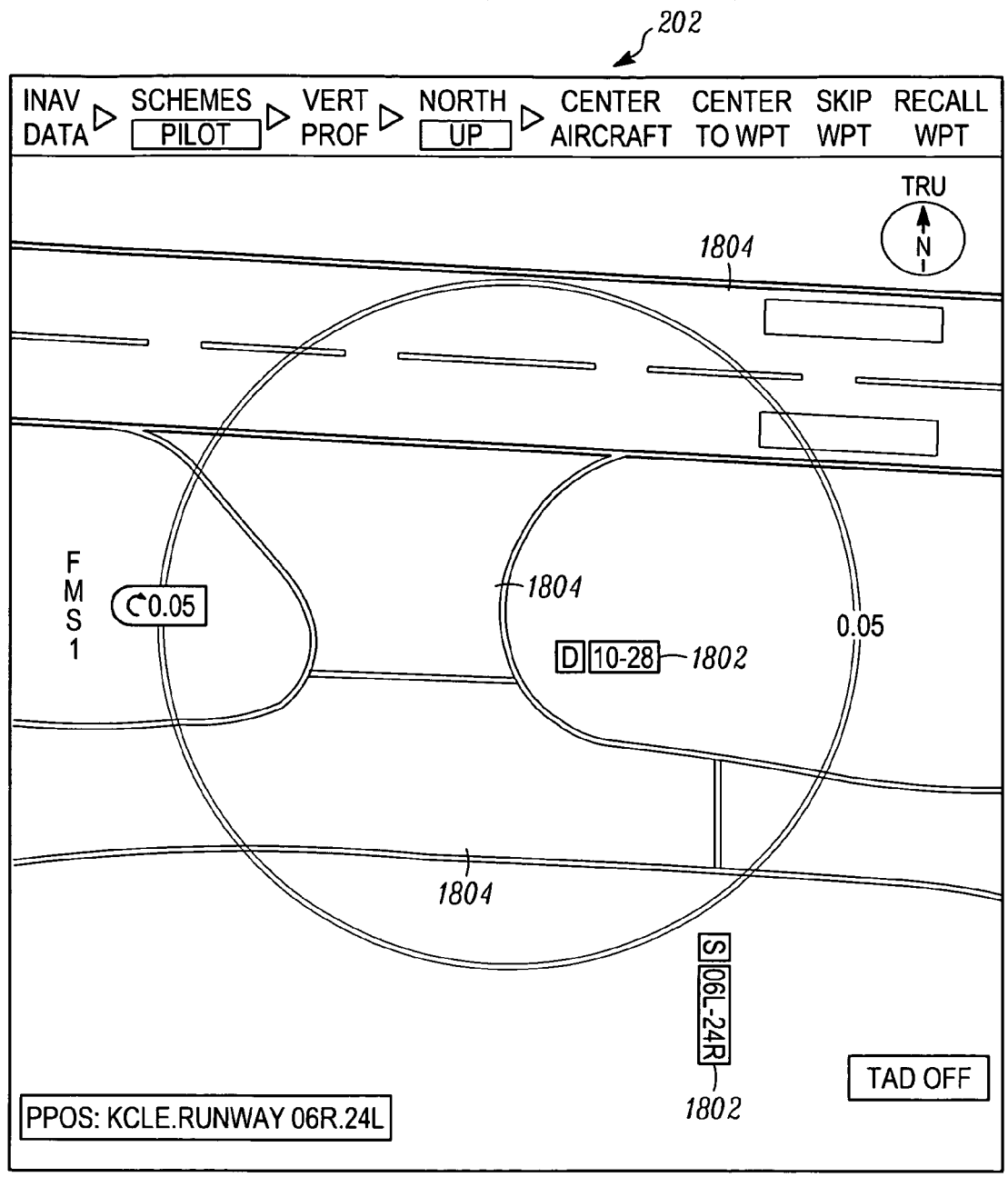
Figure 19:
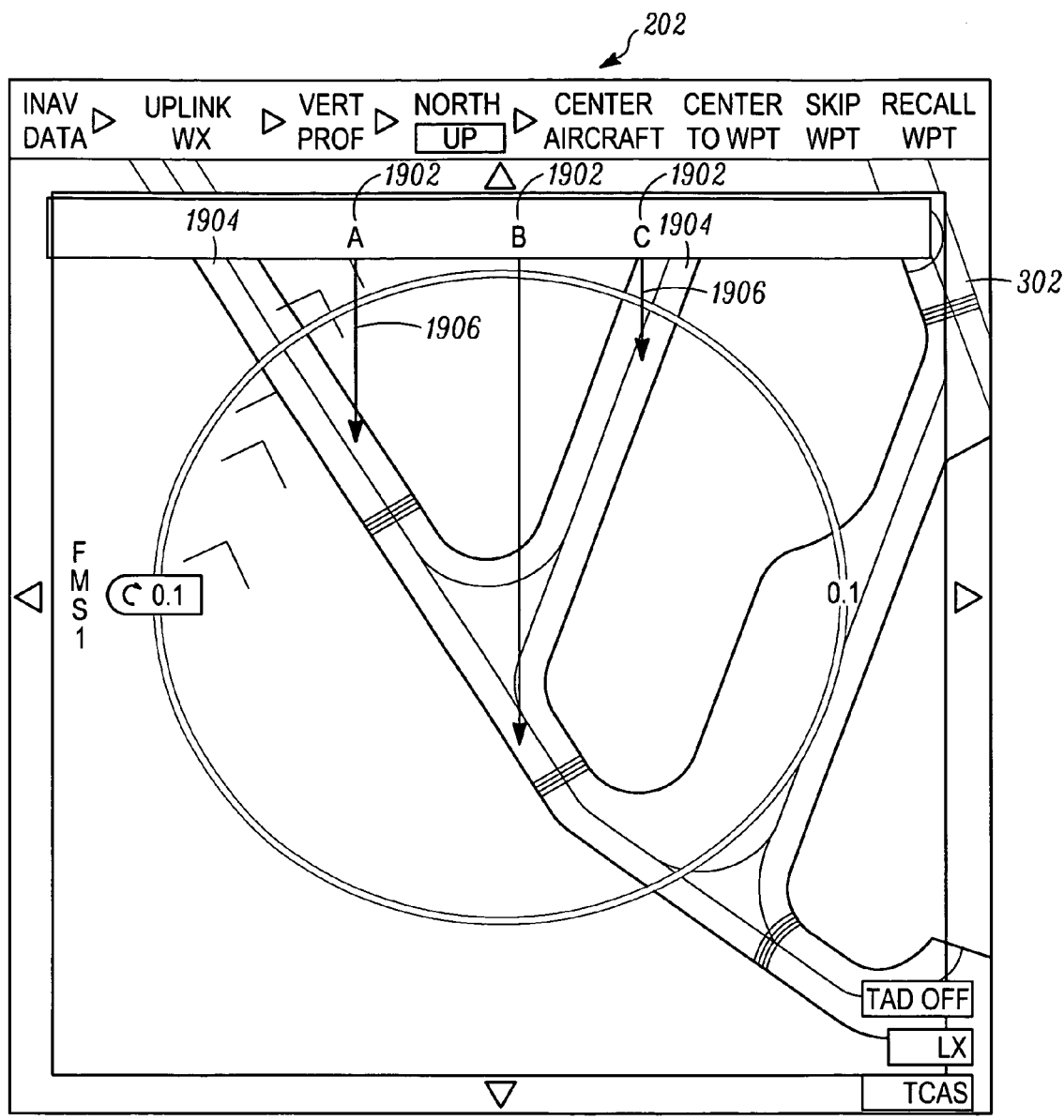
Figure 20:
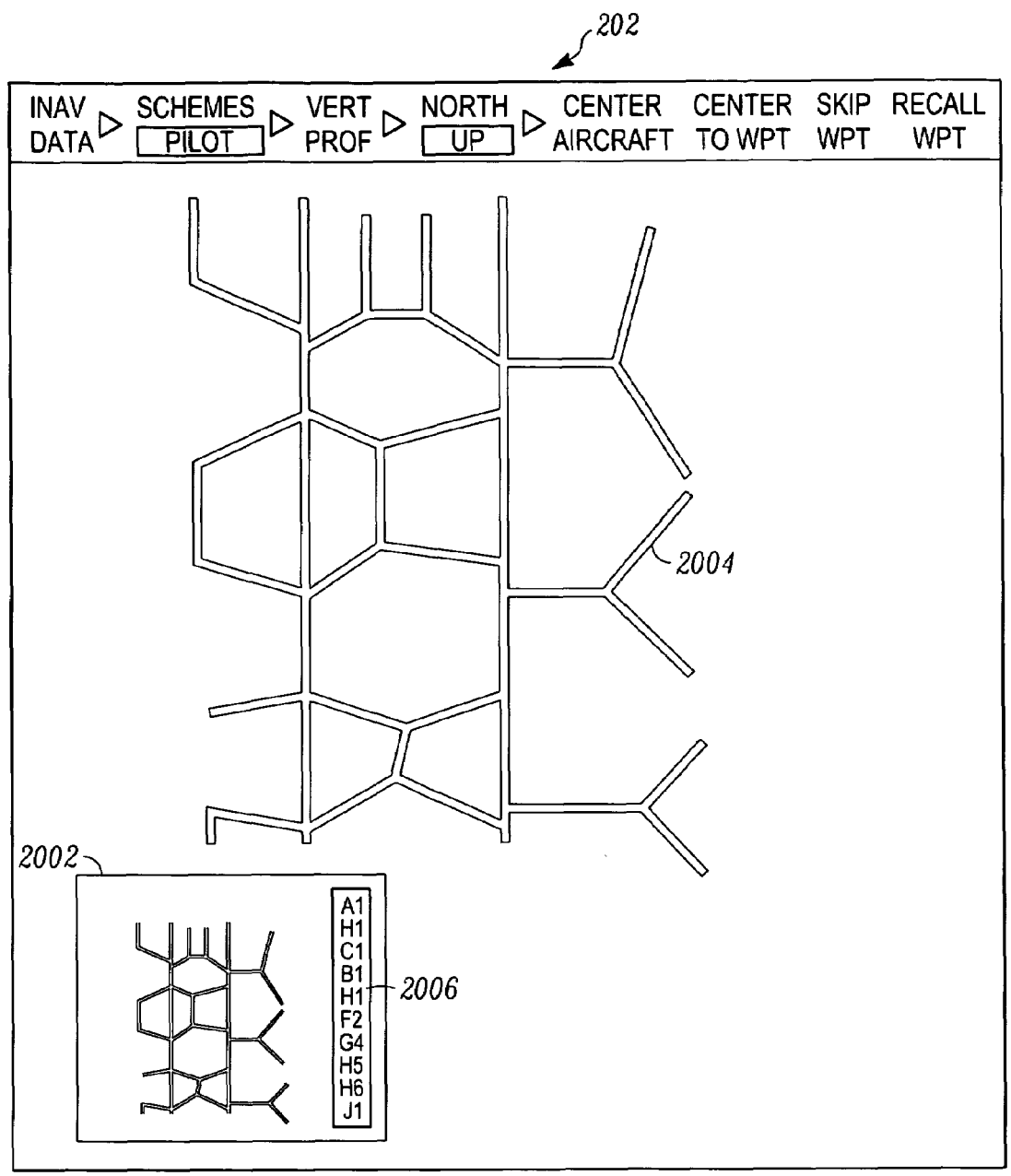
Figure 21:
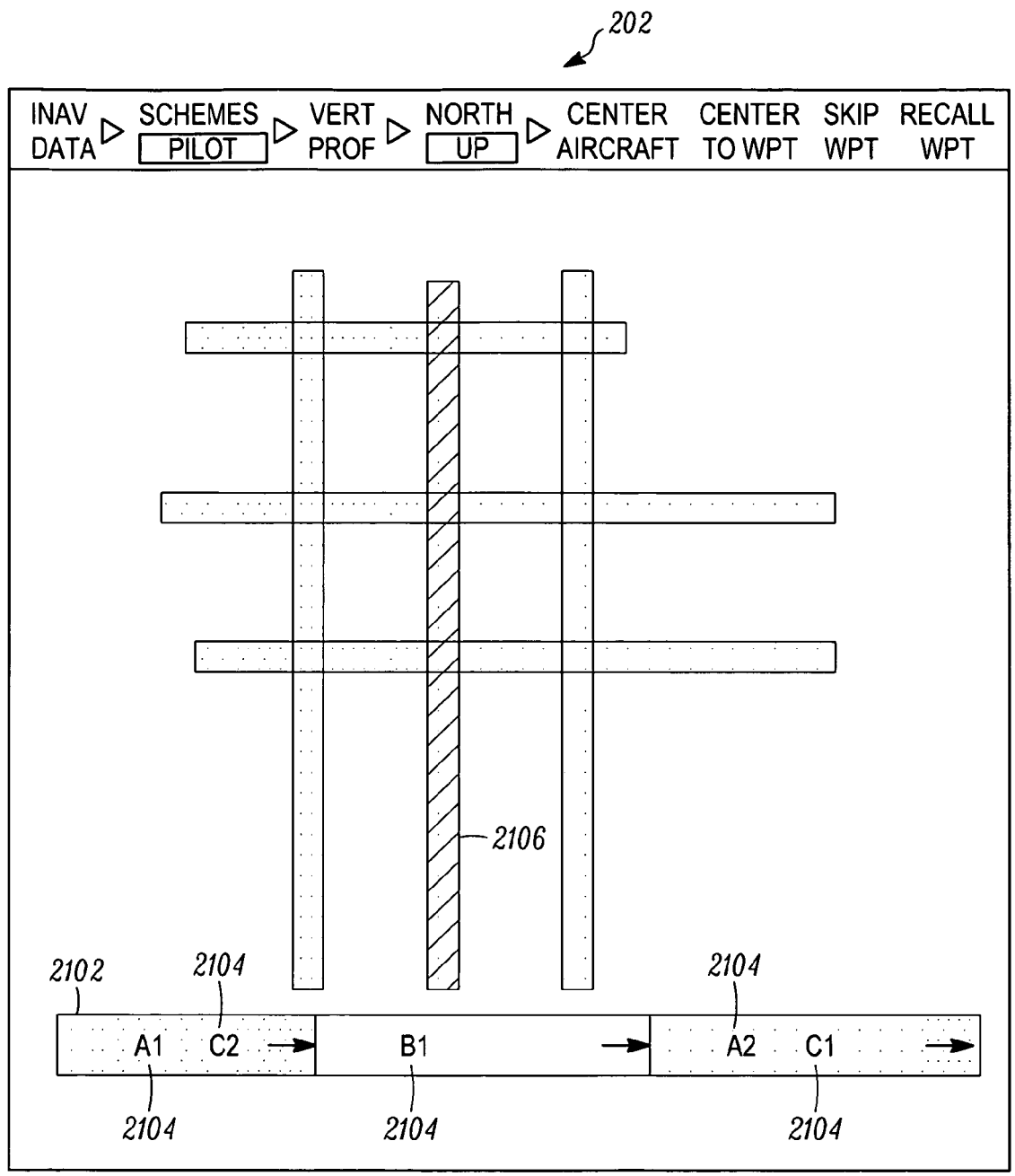

Referring now FIG. 17, with this alternative configuration the identifiers 1702 associated with an aircraft pathway 1704 are rendered in the display area 202 at the upper right corner of an approaching aircraft pathway 1704. It will be appreciated, however, that the identifiers 1702 could alternatively be rendered in any one of numerous other locations in the display area 202. In yet another alternative configuration, which is depicted in FIG. 18, the identifiers 1802 associated with an aircraft pathway 1804 are rendered in the display area 202 substantially identical to how the aircraft pathways 1804 are physically labeled at airports using sign boards. In still another alternative configuration, which is depicted in FIG. 19, the system 100 renders the identifiers 1902 associated with an aircraft pathway 1904 using drop-down arrows 1906. For example, in the depicted embodiment, an arrow 1906 drops down to each aircraft pathway 1904, and its associated identifier 1902 is rendered in the display area 202 in the upper region of the displayed airport map 302. In yet a further alternative configuration, which is depicted in FIG. 20, the system 100 renders a snapshot 2002 of the various aircraft pathways in a bottom corner of the displayed airport map 302. In particular, the snapshot 2002 is preferably rendered such that each aircraft pathway 2004 is rendered in a different color, and the corresponding identifier is rendered in a list 2006 using the same color. In the yet another disclosed alternative embodiment, the system 100 is configured to render highlighted rolling text identifiers. More specifically, and as shown in FIG. 21, the system 100 renders a running text box 2102, preferably near a bottom portion of the display area 202, that includes the identifiers 2104 associated with the rendered aircraft pathways 2104. Preferably, when an identifier 2104 is rendered in the middle of the text box 2102, the associated aircraft pathway 2106 is highlighted. Thus, in the depicted embodiment as the rolling text identifiers 2104 move to the right, as indicated by the arrows in the text box 2102, the identifier for taxiway B1 is in the middle of the text box 2102 and its associated aircraft pathway 2106 is highlighted. It will be appreciated that the system 100 could be configured such that the rolling text identifiers 2104 move in various other directions. In a final disclosed, yet non-illustrated embodiment, the system 100 is configured to selectively label the route that the aircraft would follow from runway to the apron or from the apron to the runway, after the taxi route is entered by the flight crew. Only the taxiway identifiers associated with the taxi route would be displayed. The remaining elements can be highlighted and identifiers displayed when the cursor is moved over other elements, should the flight crew desire to know identifiers for other taxiways not associated with the taxi route.

Figure 22:
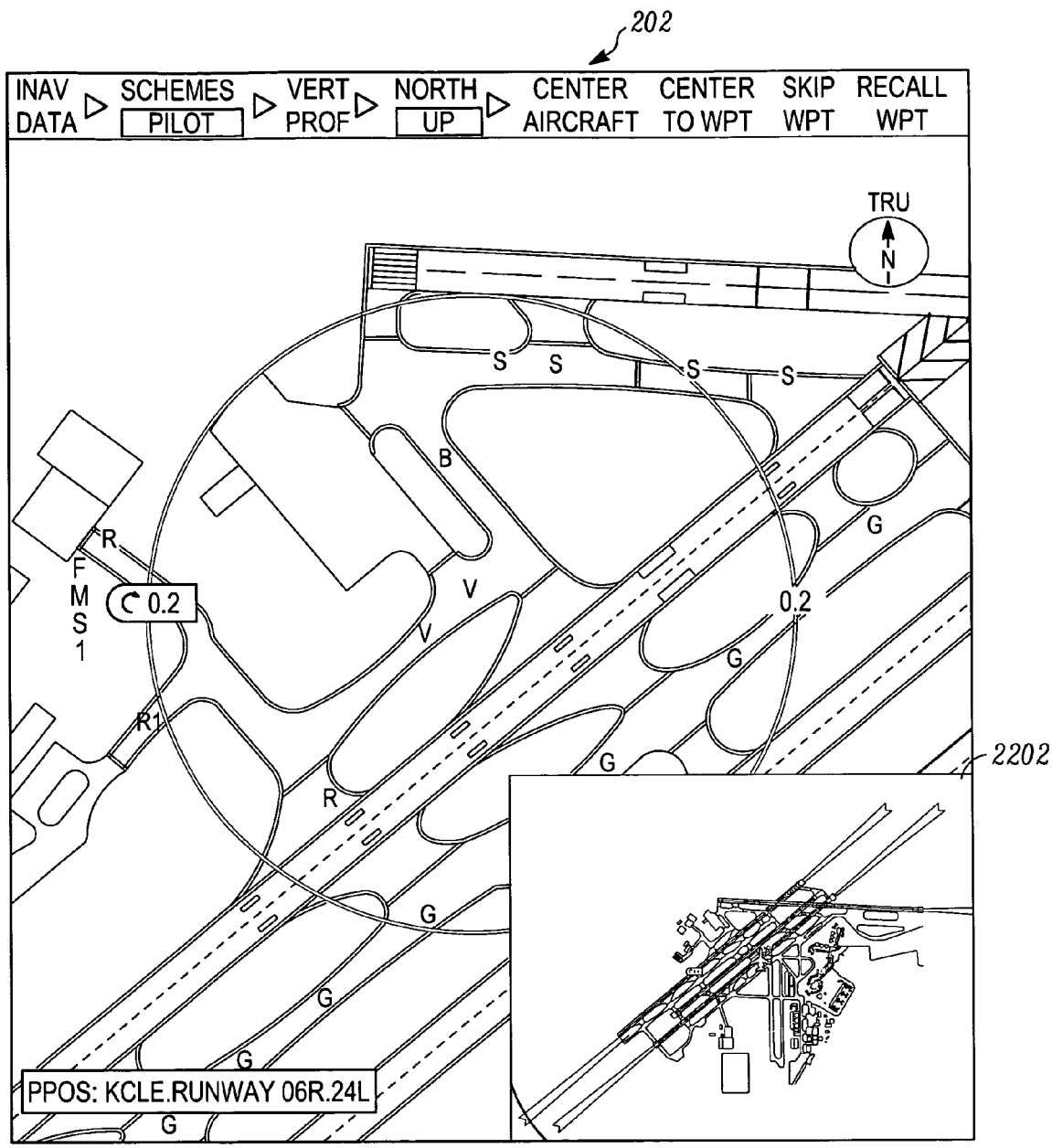
FIGS. 22-24 depict various alternative implementations for rendering graphical user interfaces useful for conducting an electronic search function of an aerodrome.
Figure 23:
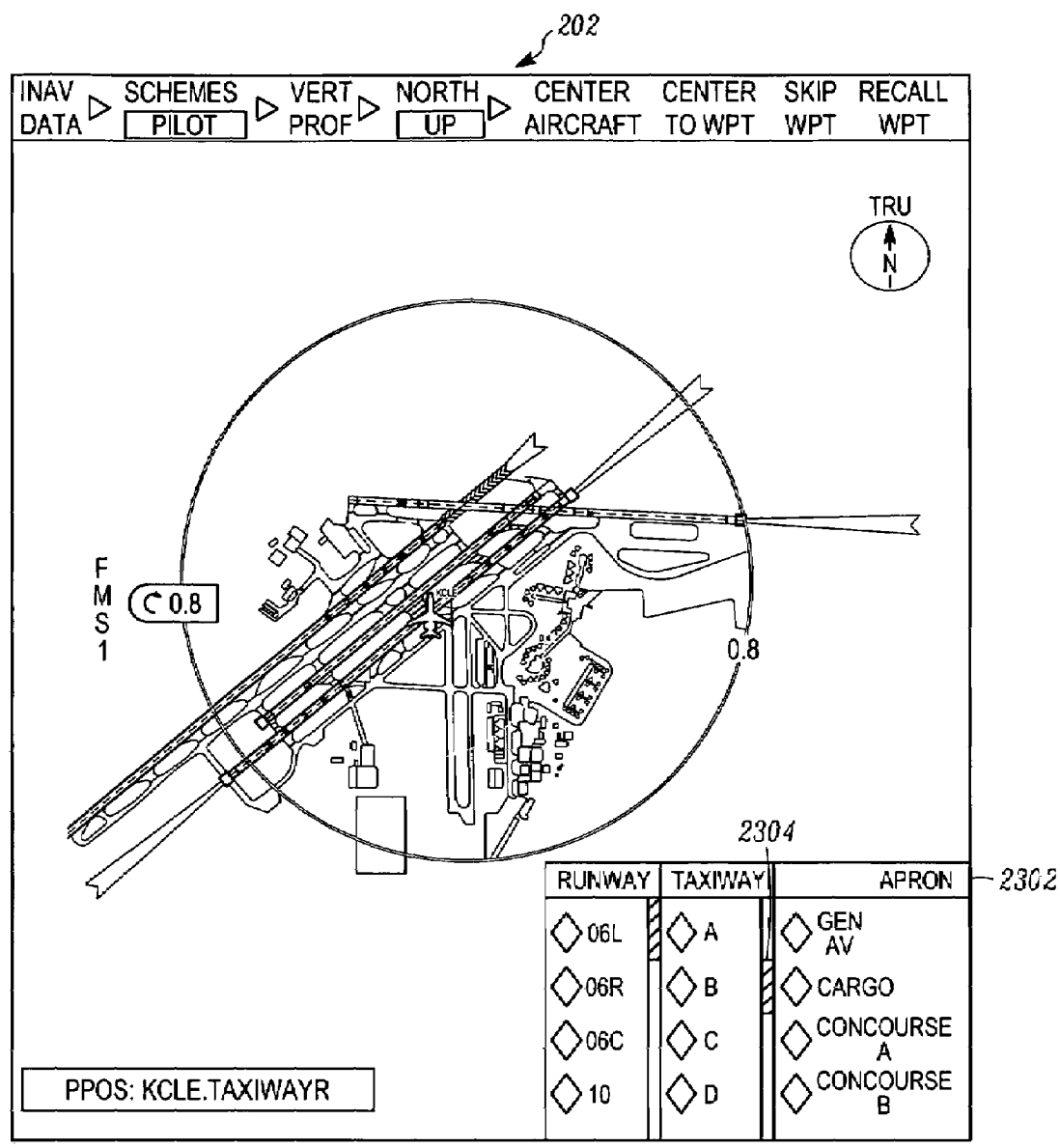
Figure 24:
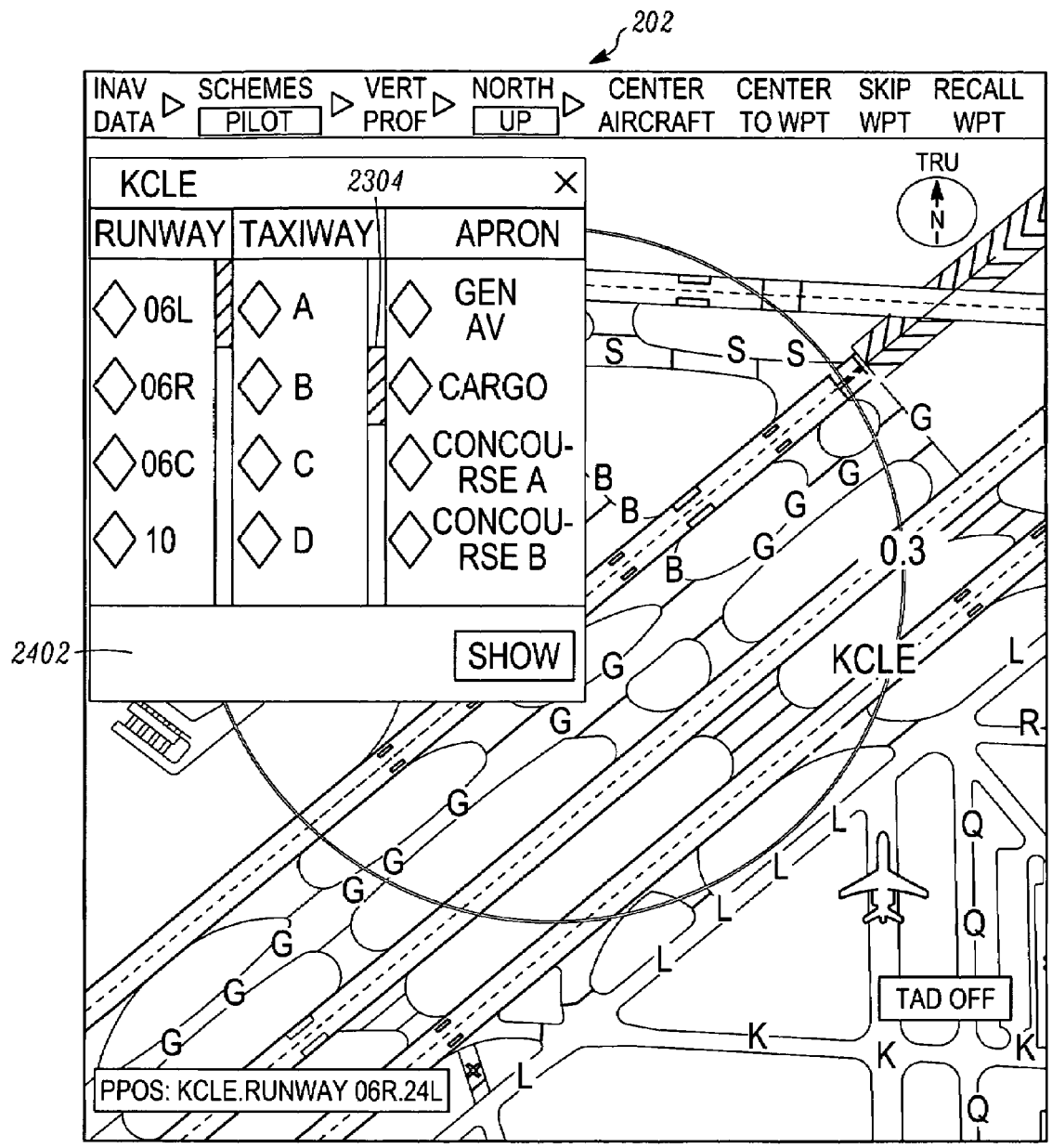

In addition to the various alternative aircraft pathway labeling configurations described above, the system 100 may additionally be configured to implement the previously described electronic search function and/or the present position function according to one or more alternative embodiments. As regards the electronic search function, rather than selectively displaying the graphical user interface drop-down menu 1102, the system 100 could be configured to render, as depicted in FIG. 22, a hotmap 2202 in a lower corner of the display area 202. The hotmap 2202 displays the entire airport map and, in response to a user 109 moving the cursor (not illustrated) onto, and/or selecting, an aircraft pathway in the hotmap 2202, the system 100 renders the region around the selected pathway in the display area 202. In other alternative embodiments, which are depicted in FIGS. 23 and 24, the electronic search function is implemented by rendering a corner list 2302 (FIG. 23) or a dialog box 2402 (FIG. 24). In both embodiments, all of the aircraft pathway identifiers are rendered, with one or more scroll bars 2304, if needed or desired. If an identifier in the rendered list is selected, the corresponding aircraft pathway is brought into view and is highlighted. With respect to alternative present position functionalities, in addition to or instead of rendering textual and or iconic displays of the present aircraft position, the system 100 could be configured to provide aural messages of the present aircraft position.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method of displaying an aircraft taxiway and its associated identifier on a flight deck display, the method comprising the steps of:
   supplying data representative of taxiway segments, each taxiway segment at least partially defining the aircraft taxiway;
   processing the data to classify at least a portion of the taxiway segments as identified segments and non-identified segments; and
   rendering, on the flight deck display, at least a portion of the taxiway segments that define the aircraft taxiway, the rendered taxiway segments including taxiway segments classified as identified segments and non-identified segments,
   wherein:
   identified segments have the identifier associated with the aircraft taxiway rendered thereon, and
   non-identified segments do not have the identifier associated with the aircraft taxiway rendered thereon.

2. The method of claim 1, further comprising:
   determining if a taxiway segment defines a taxiway intersection, a taxiway intersection being a taxiway segment that adjoins three or more taxiway segments; and
   classifying at least a portion of the rendered taxiway segments that define taxiway intersections as non-identified segments.

3. The method of claim 2, further comprising:
   determining if a taxiway segment is an end segment, an end segment being a taxiway segment that adjoins only one taxiway segment; and
   if all of the segments that define the taxiway are defined as taxiway intersections, classifying as identified segments the taxiway segments that both (i) define taxiway intersections and (ii) are end segments.

4. The method of claim 2, wherein each taxiway segment comprises a plurality of vertices, and wherein the step of determining if a taxiway segment defines a taxiway intersection, comprises:
   determining if the vertices of the taxiway segment coincide with the vertices of at least three other taxiway segments.

5. The method of claim 4, further comprising:
   comparing the vertices of each taxiway segment to determine which taxiway segments adjoin one another.

6. The method of claim 1, further comprising:
   supply data representative of non-taxiway segments, each non-taxiway segment at least partially defining an aircraft pathway that is not an aircraft taxiway;
   determining if a taxiway segment adjoins a non-taxiway segment; and
   classifying the taxiway segments that adjoin a non-taxiway segment as identified segments.

7. The method of claim 6, wherein each non-taxiway segment is selected from the group consisting of one or more airport taxiways, one or more airport runways, one or more airport stopways, and one or more airport apron elements.

8. The method of claim 1, further comprising:
   determining if a taxiway segment is an end segment, an segment being a taxiway segment that adjoins only one taxiway segment; and
   classifying at least a portion of the rendered taxiway segments that are end segments as identified segments.

9. The method of claim 8, further comprising:
   determining if a taxiway segment defines a taxiway intersection, a taxiway intersection being a taxiway segment that adjoins three or more taxiway segments; and
   selectively classifying the rendered taxiway segments that are end segments as non-identified segments if the end segments are also taxiway intersections.

10. The method of claim 8, further comprising:
    classifying an end segment as a non-identified segment if the end segment adjoins an identified segment.

11. The method of claim 1, further comprising:
    determining if the aircraft taxiway is defined by one segment and, if so, rendering the one segment as an identified segment.

12. The method of claim 1, wherein the other aircraft pathway is another taxiway.

13. The method of claim 1, wherein each of the one or more taxiway segments is a polygon, and wherein the method further comprises:
    determining a centroid of each taxiway segment; and
    rendering, on the flight deck display, the identifier associated with the aircraft taxiway at the centroid of each identified segment.

14. The method of claim 1, further comprising:
selectively rendering, on the flight deck display, one or more non-taxiway airport elements.

15. The method of claim 1, further comprising:
selectively highlighting at least a portion of the rendered taxiway.

16. The method of claim 15, further comprising:
rendering a movable cursor on the flight deck display; and
determining if the movable cursor is placed on or near the rendered taxiway and, if so, highlighting at least a portion of the rendered taxiway.

17. The method of claim 1, further comprising:
selectively rendering, on the flight deck display, a graphical user interface that is configured to receive user-entered data representative of an object; and
rendering, on the flight deck display, the object represented by the data entered by a user into the graphical user interface.

18. The method of claim 1, further comprising:
determining a present position of an aircraft in which the flight deck display is installed; and
rendering, on the flight deck display, the present position of the aircraft.

19. The method of claim 18, wherein the present position of the aircraft is rendered textually.

20. The method of claim 18, wherein the present position of the aircraft is rendered as an aircraft icon at a location representative of the determined present position.

21. A flight deck display system for an aircraft, comprising:
a processor adapted to receive data representative of one or more segments that at least partially define an aircraft taxiway and configured, upon receipt of the data, to (i) classify at least a portion of the taxiway segments as identified segments and non-identified segments and (ii) selectively supply image rendering display commands; and
a display device coupled to receive the image rendering display commands and operable, in response thereto, to render at least a portion of the taxiway segments that define the aircraft taxiway as either identified segments or non-identified segments,
wherein:
identified segments have the identifier associated with the aircraft taxiway rendered thereon, and
non-identified segments do not have the identifier associated with the aircraft taxiway rendered thereon.

22. The system of claim 21, wherein the processor, upon receipt of the data, is further configured to:
determine if a taxiway segment defines a taxiway intersection, a taxiway intersection being a taxiway segment that adjoins three or more taxiway segments; and
classify at least a portion of the taxiway segments that define taxiway intersections as non-identified segments.

23. The system of claim 22, wherein the processor, upon receipt of the data, is further configured:
to determine if a taxiway segment is an end segment, an segment being a taxiway segment that adjoins only one taxiway segment; and
if all of the segments that define the taxiway define taxiway intersections, to classify, as identified segments, the taxiway segments that both (i) define taxiway intersections and (ii) are end segments.

24. The system of claim 22, wherein:
the data representative of each taxiway segment comprises a plurality of vertices; and
if the processor determines a taxiway segment defines a taxiway intersection, the processor is further configured to determine if the vertices of the taxiway segment coincide with the vertices of at least three other taxiway segments.

25. The system of claim 24, wherein the processor, upon receipt of the data, is further configured to compare the vertices of each taxiway segment to determine which taxiway segments adjoin one another.

26. The system of claim 21, wherein the processor is further configured:
to receive data representative of non-taxiway segments, each non-taxiway segment at least partially defining an aircraft pathway that is not an aircraft taxiway;
upon receipt of the data, to determine if a taxiway segment adjoins a non-taxiway segment; and
classify the taxiway segments that adjoin a non-taxiway segment as identified segments.

27. The system of claim 26, wherein each non-taxiway segment is selected from the group consisting of one or more airport taxiways, one or more airport runways, one or more airport stopways, and one or more airport apron elements.

28. The system of claim 21, wherein the processor, upon receipt of the data, is further configured to:
determine if a taxiway segment is an end segment, an segment being a taxiway segment that adjoins only one taxiway segment; and
classify at least a portion of the rendered taxiway segments that are end segments as identified segments.

29. The system of claim 28, wherein the processor, upon receipt of the data, is further configured to:
determine if a taxiway segment defines a taxiway intersection, a taxiway intersection being a taxiway segment that adjoins three or more taxiway segments; and
selectively classify the rendered taxiway segments that are end segments as non-identified segments if the end segments are also taxiway intersections.

30. The system of claim 28, wherein the processor, upon receipt of the data, is further configured to classify an end segment as a non-identified segment if the end segment adjoins an identified segment.

31. The system of claim 21, wherein the processor, upon receipt of the data, is further configured:
to determine if the aircraft taxiway is defined by one segment; and
if so, to classify the one segment as an identified segment.

32. The system of claim 21, wherein:
each of the one or more taxiway segments is polygonal in shape; and
the processor, upon receipt of the data, is further configured to (i) determine a centroid of each taxiway segment and (ii) supply image rendering display commands to the display device that cause the display device, upon receipt of the image rendering display commands, to render the identifier associated with the aircraft pathway at the centroid of the rendered identified segments.

33. The system of claim 21, wherein the processor is further configured to supply image rendering display commands that cause the display device, upon receipt of the image rendering display commands, to selectively render one or more non-taxiway airport elements.

34. The system of claim 21, wherein the processor is further configured to:
supply image rendering display commands that cause the display device to render a movable cursor;
determine if the movable cursor is placed on or near the rendered taxiway; and
supply image rendering display commands to that cause the display device to render the at least a portion of the rendered taxiway as a highlighted taxiway, if the movable cursor is placed on or near the rendered taxiway.

35. The system of claim 21, wherein the processor is further configured to supply image rendering display commands that cause the display device to:
   selectively render a graphical user interface that is configured to receive user-entered data representative of an aerodrome object; and
   render the aerodrome object represented by the data entered by a user into the graphical user interface.

36. The system of claim 21, wherein the processor is further configure to:
   receive data representative of a present position of the aircraft; and
   supply image rendering display commands that cause the display device to render the present position of the aircraft.

37. The system of claim 36, wherein image rendering display commands cause the display device to render the present position of the aircraft textually.

38. The system of claim 36, wherein the image rendering display commands cause the display device to render the present position of the aircraft as an aircraft icon at a location representative of the determined present position.

39. A flight deck display system for an aircraft, comprising:
   a cursor control device configured to move and, upon movement thereof, to supply cursor movement signals representative thereof
   a processor adapted to receive (i) data representative of one or more segments that at least partially define an aircraft taxiway and (ii) the cursor movement signals and configured, upon receipt thereof, to (i) classify at least a portion of the taxiway segments as identified segments and non-identified segments and (ii) selectively supply image rendering display commands; and
   a display device coupled to receive the image rendering display commands and operable, in response thereto, to (i) render at least a portion of the taxiway segments that define the aircraft taxiway as either identified segments or non-identified segments and (ii) selectively highlight the rendered taxiway segments,
   wherein:
      identified segments have the identifier associated with the aircraft taxiway rendered thereon,
      non-identified segments do not have the identifier associated with the aircraft taxiway rendered thereon, and
      the rendered taxiway segments are highlighted if the cursor is moved on or near the rendered taxiway segments.

40. A flight deck display system for an aircraft, comprising:
   a processor adapted to receive (i) data representative of one or more segments that at least partially define an aircraft taxiway and (ii) user interface selection commands and configured, upon receipt thereof, to (i) classify at least a portion of the taxiway segments as identified segments and non-identified segments and (ii) selectively supply image rendering display commands; and
   a display device coupled to receive the image rendering display commands and operable, in response thereto, to render (i) at least a portion of the taxiway segments that define the aircraft taxiway as either identified segments or non-identified segments, (ii) a graphical user interface that is configured to receive user-entered data representative of an object, and (iii) the object represented by the data entered by a user into the graphical user interface,
   wherein:
      identified segments have the identifier associated with the aircraft taxiway rendered thereon, and
      non-identified segments do not have the identifier associated with the aircraft taxiway rendered thereon.

41. A flight deck display system for an aircraft, comprising:
   a processor adapted to receive (i) data representative of one or more segments that at least partially define an aircraft taxiway and (ii) data representative of a present position of the aircraft and configured, upon receipt thereof, to (i) classify at least a portion of the taxiway segments as identified segments and non-identified segments and (ii) selectively supply image rendering display commands; and
   a display device coupled to receive the image rendering display commands and operable, in response thereto, to render (i) at least a portion of the taxiway segments that define the aircraft taxiway as either identified segments or non-identified segments and (ii) the present position of the aircraft,
   wherein:
      identified segments have the identifier associated with the aircraft taxiway rendered thereon, and
      non-identified segments do not have the identifier associated with the aircraft taxiway rendered thereon.

* * * * *